(12) United States Patent
Ohtani et al.

(10) Patent No.: US 7,987,147 B2
(45) Date of Patent: Jul. 26, 2011

(54) INFORMATION PROCESSING APPARATUS, INFORMATION PROCESSING METHOD, AND PROGRAM BASED ON OPERATOR PROBABILITY USING SENSORS

(75) Inventors: Shinya Ohtani, Kanagawa (JP); Hiroaki Ogawa, Chiba (JP)

(73) Assignee: Sony Corporation, Tokyo (JP)

( * ) Notice: Subject to any disclaimer, the term of this patent is extended or adjusted under 35 U.S.C. 154(b) by 851 days.

(21) Appl. No.: 11/750,206

(22) Filed: May 17, 2007

(65) Prior Publication Data

US 2007/0276690 A1 Nov. 29, 2007

(30) Foreign Application Priority Data

May 18, 2006 (JP) ................................. 2006-138586

(51) Int. Cl.
*G06F 17/00* (2006.01)
*G06N 5/00* (2006.01)

(52) U.S. Cl. .......................................................... 706/45

(58) Field of Classification Search ...................... 706/45
See application file for complete search history.

(56) References Cited

U.S. PATENT DOCUMENTS

| 5,550,928 A | 8/1996 | Lu et al. |
| 5,771,307 A | 6/1998 | Lu et al. |
| 5,945,988 A | 8/1999 | Williams et al. |
| 5,977,964 A | 11/1999 | Williams et al. |
| 2002/0194586 A1 | 12/2002 | Gutta et al. |
| 2003/0227439 A1* | 12/2003 | Lee et al. ............... 345/156 |
| 2004/0117330 A1* | 6/2004 | Ehlers et al. ............ 705/412 |
| 2006/0182346 A1 | 8/2006 | Yoda et al. |

FOREIGN PATENT DOCUMENTS

| JP | 11-327753 | 11/1999 |
| JP | 2005-236354 | 9/2005 |
| JP | 2005-242759 | 9/2005 |
| JP | 2006-309448 | 11/2006 |
| WO | WO 97/47135 | 12/1997 |
| WO | WO 02/32136 | 4/2002 |
| WO | WO 0232136 A2 * | 4/2002 |
| WO | WO 03/025859 | 3/2003 |

OTHER PUBLICATIONS

McKenna et al. "Tracking Faces", IEEE, Proc. 2nd ICAFGR, 1996, pp. 1-7.*

* cited by examiner

*Primary Examiner* — Jeffrey A Gaffin
*Assistant Examiner* — Li-Wu Chang
(74) *Attorney, Agent, or Firm* — Finnegan, Henderson, Farabow, Garrett & Dunner, L.L.P.

(57) ABSTRACT

The present invention provides an information processing apparatus for carrying out processes in response to how a user behaves. The information processing apparatus includes a sensor device, operator probability computation means, and processing means. The sensor device is configured to sense conditions. The operator probability computation means is configured to compute an operator probability representing how likely each of at least one target is to be an operator operating the information processing apparatus on the basis of an output of the sensor device, the target being the user staying close to the apparatus. The processing means configured to perform a predetermined process based on the operator probability.

23 Claims, 16 Drawing Sheets

| USER | PREFERENCE INFORMATION |
|------|------------------------|
| T₁   | VECTOR V₁              |
| T₂   | VECTOR V₂              |
| ⋮    | ⋮                      |
| Tₙ   | VECTOR Vₙ              |

PREFERENCE TABLE

INFORMATION PROCESSING APPARATUS, INFORMATION PROCESSING METHOD, AND PROGRAM BASED ON OPERATOR PROBABILITY USING SENSORS

CROSS REFERENCES TO RELATED APPLICATIONS

The present invention contains subject matter related to Japanese Patent Application JP 2006138586 filed with the Japanese Patent Office on May 18, 2006, the entire contents of which being incorporated herein by reference.

BACKGROUND OF THE INVENTION

1. Field of the Invention

The present invention relates to an information processing apparatus, an information processing method, and a program. More particularly, the invention relates to an information processing apparatus, an information processing method, and a program for offering relevant services to users without requiring them to carry out elaborate actions.

2. Description of the Related Art

Illustratively, there exist so-called interaction apparatuses capable of performing diverse processes through interaction with users. The interaction apparatus typically accepts users' actions such as speeches and gestures as interaction signals and executes processes corresponding to these interaction signals. In this manner, the interaction apparatus may recommend TV programs, change channels, and perform other actions for the users' sake in response to their actions.

In the description that follows, the users who stay near the interaction apparatus will be referred to as targets. Likewise the person who operates (or is willing to operate) the interaction apparatus will be called the operator where appropriate.

There exist techniques for identifying gestures of people based on their images picked up by an image sensor, thereby estimating their actions and intentions (e.g., see Japanese Patent Laid-open No. 2005-242759).

There have also been proposed interface devices that identify persons and recognize their gestures so as to control the equipment (e.g., see International Publication WO 2003/025859 Pamphlet).

SUMMARY OF THE INVENTION

Some of the interaction apparatuses proposed so far assume that there is one target near the apparatus and that the apparatus performs actions by taking the single target for the operator.

This type of interaction apparatus is typically designed to assume a narrow space resembling that of a telephone booth as the space in which one target can reside. The intention is to uphold the assumption that there is only target.

There may well be a plurality of targets coming into that narrow space. In anticipation of such cases, the interaction apparatus is typically constrained to select one of the multiple targets as the operator on the basis of heuristic rules devised empirically by designers (e.g., one rule may assume that a person positioned far away is not the operator; another may assume that a person just passing by is not the operator).

Another type of the existing interaction apparatuses assumes that there are a plurality of targets near the apparatus and that any one of them can be the operator. In this case, the action of each of the multiple targets is sensed and accepted as an interaction signal by the apparatus.

However, where the interaction apparatus takes the action of each of a plurality of targets to be an interaction signal, the true operator wishing to actually operate the interaction apparatus is often disrupted by the actions of the other targets.

Generally, the users who could each be a potential target often stay close to the interaction apparatus without being aware of it. As a result, the interaction apparatus often recognizes mistakenly the speeches and gestures of those users with no intention of becoming operators as interaction signals that will hamper the apparatus from getting operated by the user willing to become the operator.

In order to bypass such problems, the interaction apparatus may be arranged to select a particular user as the target if that user gives a specific speech such as "I am the user" or makes a predetermined gesture.

However, the arrangement requiring the user to give an explicit speech (e.g., "I am the user") or carry out a particular gesture forces the user to execute complicated actions preparatory to starting the interaction apparatus. This makes it difficult to start utilizing the interaction apparatus smoothly and quickly, inconveniencing the user.

Illustratively, suppose that the interaction apparatus has the ability to recommend TV programs matching a given operator's preferences and that a target wants the apparatus to recommend TV programs to him or her. In that case, it is necessary for any one target to manifest himself or herself as the operator by performing an explicit action such as saying "I am the user." If two targets are near the interaction apparatus and if one of them has been acting as the operator, the other target performs an explicit action when expressing his or her intention to become the operator (e.g., saying "I am the user"), which can be a very complicated procedure.

In order to anticipate any target carrying out an explicit action to express his or her intention to become the operator, the interaction apparatus prepares for interrupt handling throughout its interaction processing. To implement such processing needs elaborate software design.

The interaction apparatus recommending TV programs matching the operator's preferences as described above stores beforehand personal information including the preferences of the targets who are operator candidates. One of the targets near the interaction apparatus is selected as the operator and recognized (identified) as such through sensing techniques such as face recognition. TV programs are then recommended on the basis of the preference information about the operator thus recognized.

Some of the existing interaction apparatuses recognize each of a plurality of targets nearby as operators and accept all of their actions as interaction signals as outlined above. This type of interaction apparatus is capable of recognizing multiple targets through face recognition, but has difficulty in providing services such as recommendation of TV programs by suitably utilizing the preference information about each of the targets.

The typical interaction apparatus accepting the actions of all targets as interaction signals can generally perform one of two things: after recognizing each of multiple targets through face recognition, the apparatus may pick up one of them as the main operator and recommend TV programs based on the preference information about that operator; or the interaction apparatus may average the preference information about all targets and recommend TV programs based on the averaged preference information.

Still another type of interaction apparatus may conceivably need each of a plurality of targets nearby to enter through a keyboard or the like his or her personal information and likelihood of becoming the operator. This arrangement would make it possible to recommend TV programs by utilizing the preference information about each of the multiple targets in a manner reflecting his or her likelihood of becoming the operator.

However, the arrangement above is laborious in that it involves having each target enter his or her personal information as well as his or her likelihood of becoming the operator into the interaction apparatus. In the event of added or reduced targets nearby, the interaction apparatus is incapable of quickly addressing the changes. This can be a significant inconvenience for the users.

The need has been felt for an interaction apparatus capable of offering relevant services to users as targets without requiring them to perform onerous actions such as an explicit declaration of being the operator.

The present invention has been made in view of the above circumstances and provides arrangements whereby users are offered suitable services without having to perform complicated actions.

In carrying out the present invention and according to one embodiment thereof, an information processing apparatus for carrying out processes in response to how a user behaves includes: a sensor device configured to sense conditions; operator probability computation means configured to compute an operator probability representing how likely each of at least one target is to be an operator operating the information processing apparatus on the basis of an output of the sensor device, the target being the user staying close to the apparatus; and processing means configured to perform a predetermined process based on the operator probability.

According to another embodiment of the present invention, an information processing method or a program for causing an information processing apparatus or a program to carry out an information processing procedure in response to how a user behaves includes the steps of: computing an operator probability representing how likely each of at least one target is to be an operator operating the information processing apparatus on the basis of an output of a sensor device configured to sense conditions, the target being the user staying close to the apparatus; and performing a predetermined process based on the operator probability.

Where the information processing apparatus, information processing method, or program according to the present invention is in use, the probability of each of at least one target being an operator operating the apparatus or the computer is computed as the operator probability on the basis of an output of a sensor device configured to sense conditions, the target being the user staying close to the apparatus or the computer. A predetermined process is then performed on the basis of the operator probability thus computed.

According the above-outlined embodiments of the present invention, the user may be offered relevant services without having to behave in an elaborate or complicated manner.

DETAILED DESCRIPTION OF THE PREFERRED EMBODIMENTS

Figure 1:
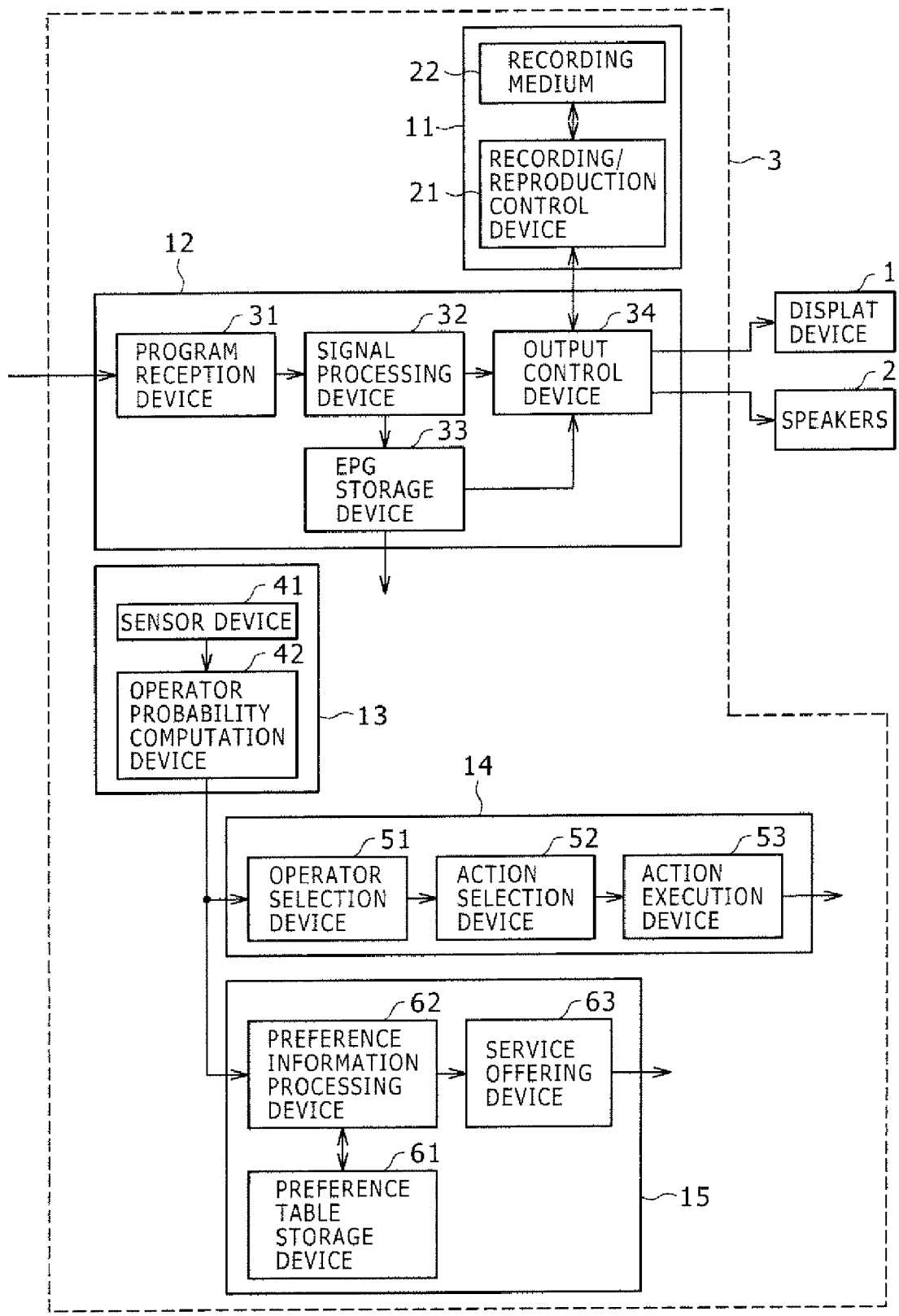
FIG. 1 is a block diagram showing a typical structure of an AV system according to the embodiment of the present invention.

What is described below as the preferred embodiments of the present invention with reference to the accompanying drawings corresponds to the appended claims as follows: the description of the preferred embodiments basically provides specific examples supporting what is claimed. If any example of the invention described below as a preferred embodiment does not have an exactly corresponding claim, this does not means that the example in question has no relevance to the claims. Conversely, if any example of the invention described hereunder has a specifically corresponding claim, this does not mean that the example in question is limited to that claim or has no relevance to other claims.

One embodiment of the present invention is an information processing apparatus (e.g., HD recorder 3 in FIG. 1) for carrying cut processes in response to how a user behaves. The information processing apparatus includes: a sensor device (e.g., sensor device 41 in FIG. 1) configured to sense conditions; operator probability computation means (e.g., operator probability computation device 42 in FIG. 1) configured to compute an operator probability representing how likely each of at least one target is to be an operator operating the information processing apparatus on the basis of an output of the sensor device, the target being the user staying close to the apparatus; and processing means (e.g., interaction device 14 and program recommendation device 15 in FIG. 1) configured to perform a predetermined process based on the operator probability.

Preferably, the operator probability computation means may further include: information extraction means (e.g., information extraction device 101 in FIG. 6) configured to extract from the output of the sensor device, information about each of such at least one target; target information creation means (e.g., target information creation device 102 in FIG. 6) configured to create target information about each of such at least one target out of the information extracted by the information extraction means; and probability computation means (e.g., probability computation device 104 in FIG.

6) configured to compute the operator probability for each of such at least one target on the basis of the target information about each of such at least one target.

Preferably, the operator probability computation means may further include storage means (e.g., target information storage device 103 in FIG. 6) configured to store the target information created chronologically by the target information creation means; and the pro ability computation means may compute the operator probability based on the chronological target information stored in the storage means.

Preferably, the processing means may further include: operator selection means (e.g., operator selection device 51 in FIG. 1) configured to select the target with the highest operator probability as the operator; action selection means (e.g., action selection device 52 in FIG. 1) configured to select an action to be performed in response to how the operator behaves; and action execution means (e.g., action execution device 53 in FIG. 1) configured to execute a process corresponding to the action selected by the action selection means.

Preferably, the processing means may further include: preference information storage means (e.g., preference table storage device 61 in FIG. 1) configured to store preference information representative of preferences of each of such at least one target; preference information processing means (e.g., preference information processing device 62 in FIG. 1) configured to create program recommendation-intended preference information for recommending programs out of the preference information about each of such at least one target in accordance with the operator probability for each of such at least one target; and service offering means (e.g., service offering device 63 in FIG. 1) configured to offer a program recommending service based on the program recommendation-intended preference information.

Another embodiment of the present invention is an information processing method or a program for causing an information processing apparatus or a computer to carry out an information processing procedure in response to how a user behaves. The procedure includes the steps of: computing (e.g., in steps S101 through S104 of FIG. 15) an operator probability representing how likely each of at least one target is to be an operator operating the information processing apparatus or the commuter on the basis of an output of a sensor device configured to sense conditions, the target being the user staying close to the apparatus or the computer; and performing (e.g., in steps S11 through S14 of FIG. 2 and in steps S21 through S24 of FIG. 3) a predetermined process based on the operator probability.

The preferred embodiments of the present invention will now be described in more detail with reference to the accompanying drawings.

FIG. 1 is a block diagram showing a typical structure of an AV (Audio Visual) system acting as an interaction apparatus according to the embodiment of the present invention.

In FIG. 1, the AV system is made up of a display device 1, speakers 2, and a hard disk (HD) recorder 3.

The display device 1 is constituted illustratively by a CRT (Cathode Ray Tube) or an LCD (Liquid Crystal Display) that displays images corresponding to video data supplied by the HD recorder 3. The speakers 2 output sounds that reflect audio data fed by the HD recorder 3.

The HD recorder 3 is composed of a recording/reproduction device 11, a TV (television) device 12, a target information acquisition device 13, an interaction device 14, and a program recommendation device 15.

The recording/reproduction device 11 is formed by a recording/reproduction control device 21 and a recording medium 22. Thus structured, the recording/reproduction device 11 records and reproduces video and audio data.

More specifically, the recording/reproduction device 21 records to the recording medium 22 video and audio data supplied by the TV device 12. From the recording medium 22, the recording/reproduction device 21 reproduces (i.e., reads) video and audio data and sends the retrieved data to the TV device 12.

The recording medium 22, typically a hard disk, is driven by the recording/reproduction control device 21 to record video and audio data.

Alternatively, the recording/reproduction control device 21 may write and read video and audio data to and from a recording medium such as a DVD (Digital Versatile Disc), not shown, that can be removably attached to the HD recorder 3.

The TV device 12 is made up of a program reception device 31, a signal processing device 32, an EPG (Electronic Program Guide) storage device 33, and an output control device 34. The TV device 12 acquires TV program data and other information and feeds what is acquired to the display device 1, speakers 2, and recording/reproduction device 11.

Illustratively, the program reception device 31 receives TV broadcast signals transmitted terrestrially or through a CATV (cable television) setup and supplies the received signals to the signal processing device 32. Alternatively, the program reception device 31 may receive TV program data and other information from servers on the Internet and feed what is received to the signal processing device 32.

The signal processing device 32 suitably processes the data (signals) fed from the program reception device 31 and extracts video and audio data constituting EPG data ant TV programs from the processed data. Furthermore, the signal processing device 32 supplies the EPG data to the EPG storage device 33 and sends the video and audio data constituting TV programs to the output control device 34.

The EPG storage device 33 stores the EPG data sent from the signal processing device 32. Every time new EPG data is supplied from the signal processing device 32, the EPG storage device 33 updates its stored contents with the new data. In this manner, the EPG storage device 33 retains the latest EPG data. The EPG data held in the EPG storage device 33 is referenced as necessary by relevant blocks.

The output control device 34 sends the video data supplied from the recording/reproduction device 11 and signal processing device 32 to the display device 1 for display of corresponding images. The output control device 34 also feeds the audio data from the same sources to the speakers 2 for output of corresponding sounds.

The output control device 34 sends the video and audio data coming from the signal processing device 32 to the recording/reproduction device 11 for recording therein. Furthermore, the output control device 34 reads EPG data from the EPG storage device 33 and supplies the retrieved data to the display device 1 for display of corresponding EPG screens.

In addition, the output control device 34 sends data supplied by other blocks from time to time to the display device 1 or speakers 2 for output of corresponding images or sounds.

The target information acquisition device 13 is formed by a sensor device 41 and an operator probability computation device 42. In operation, the target information acquisition device 13 acquires target information about each of at least one target near the HD recorder 3, the target being the user. The target information thus acquired is supplied to the interaction device 14, program recommendation device 15, and other relevant blocks.

The sensor device 41 senses conditions and outputs sensor signals reflecting the results of the sensing.

Given the sensor signals from the sensor device 41, the operator probability computation device 42 acquires target information about each of at least one target near the HD recorder 3, the information representing the behavior of each target (i.e., target conditions). Also on the basis of the sensor signals from the sensor device 41, the operator probability computation device 42 computes an operator probability representing how likely each of at least one target near the HD recorder 3 is to be the operator. The operator probability thus computed is included in the target information about each target and supplied to the interaction device 14, program recommendation device 15, and other relevant blocks.

The interaction device 14 is constituted by an operator selection device 51, an action selection device 52, and an action execution device 53. In operation, the interaction device 14 performs predetermined processes based on the operator probabilities and other data included in the target information sent from the target information acquisition device 13.

The operator selection device 51 selects the target with the highest operator probability included in the target information coming from the target information acquisition device 13. The information about the operator thus selected is forwarded by the operator selection device 51 to the action selection device 52.

Given the target information from the operator selection device 51 (i.e., information about the operator's behavior), the action selection device 52 selects the action to be performed accordingly, and sends action information denoting the selected action to the action execution device 53.

The action execution device 53 carries out processes corresponding to the action represented by the action information coming from the action selection device 52, i.e., corresponding to the action selected by the action selection device 52.

The program recommendation device 15 is made up of a preference table storage device 61, a preference information processing device 62, and a service offering device 63. In operation, the program recommendation device 15 carries cut predetermined processes based on the operator probabilities and other data included in the target information supplied by the target information acquisition device 13.

The preference table storage device 61 stores a preference table that stores preference information representing the preferences of each user who could be the potential target.

The preference information processing device 62 creates preference information based illustratively on the TV programs viewed by users who could potentially be the target each and on the TV programs reserved by these users for unattended recording (i.e., to the recording medium 22). The preference information thus created is written to the preference table held by the reference table storage device 61. The TV programs viewed so far by the users include those viewed in real time as well as those reserved for unattended recording to the recording medium 22 before they were reproduced subsequently for viewing.

The preference information processing device 62 creates program recommendation-intended preference information for recommending TV programs on the basis of the operator probabilities included in the target information coming from the target information acquisition device 13 and in accordance with the preference information about the targets (i.e., users) stored in the preference table held by the preference table storage device 61. The program recommendation-intended preference information thus created is supplied to the service offering device 63.

The service offering device 63 offers services recommending TV programs based on the program recommendation-intended preference information supplied from the preference information processing device 62.

More specifically, the service offering device 63 creates a recommendation screen including recommended TV program listings and sends the created screen to the output control device 34 in the TV device 12 for display on the display device 1 or for output through the speakers 2.

Figure 2:
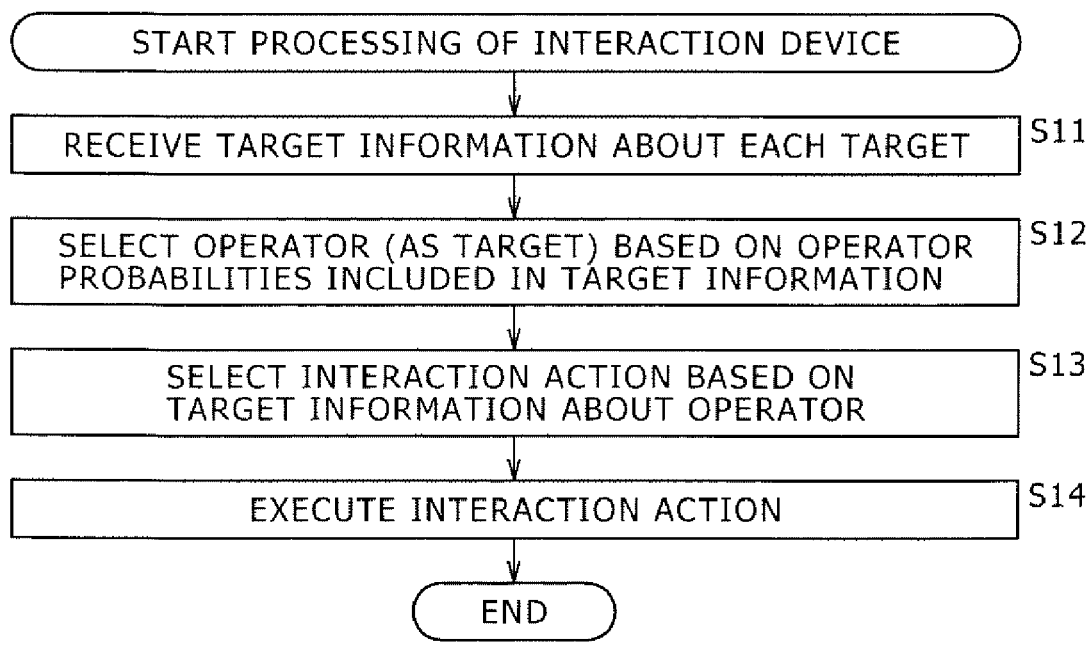
FIG. 2 is a flowchart of steps constituting a process performed by an interaction device.

Described below with reference to the flowchart of FIG. 2 is a process performed by the interaction device 14 shown in FIG. 1.

As discussed above, the target information acquisition device 13 acquires target information about each of at least one target near the HD recorder 3 and feeds the acquired information to the interaction device 14. The operator selection device 51 in the interaction device 14 waits for the target information about each target to come from the target information acquisition device 13. In step S11, the operator selection device 51 receives the target information about each target from the target information acquisition device 13. Following receipt of the target information, step S12 is reached.

In step S12, the operator selection device 51 selects the target with the highest operator probability as the operator out of the target information received from the target information acquisition device 13. The selected target information is supplied to the action selection device 52, before step S13 is reached.

In step S13, the action selection device 52 selects the action to be carried out by the HD recorder 3 in response to the operator's behavior, i.e., conditions indicated by the target information coming from the operator selection device 51. The action selection device 52 sends action information denoting the selected action to the action execution device 53, before step S14 is reached.

The action execution device 53 executes processes corresponding to the action denoted by the action information sent from the action selection device 52.

More specifically, if the action information represents the action of changing TV programs to be received or of switching channels, then the action execution device 53 causes the program reception device 31 in the TV set 12 to change the TV programs to be received or to switch the channels.

Thereafter, the interaction device 14 returns to step S11 when the target information about each target is again supplied from the target information acquisition device 13. The subsequent steps are then repeated.

As described, the interaction device 14 illustratively selects the target with the highest operator probability as the operator. In response to the target information about the selected operator (i.e., in regard to the operator's behavior), the interaction device 14 selects and executes the action to be carried out by the HD recorder 3.

All targets other than the target with the highest operator probability (i.e., targets with lower operator probabilities) are ignored. As a result, the likelihood of the behavior of the lesser targets being mistakenly recognized as that of the operator is significantly reduced. This makes it possible for the HD recorder 3 to execute actions in a stable manner for interaction with the user acting as the operator.

There is no need for the user acting as the operator to display complicated or elaborate behavior such as performing an explicit action manifesting himself or herself as the operator. Regardless of the absence of such user intervention, the HD recorder 3 can offer the user relevant services such as changing of channels as desired by the user.

Figure 3:
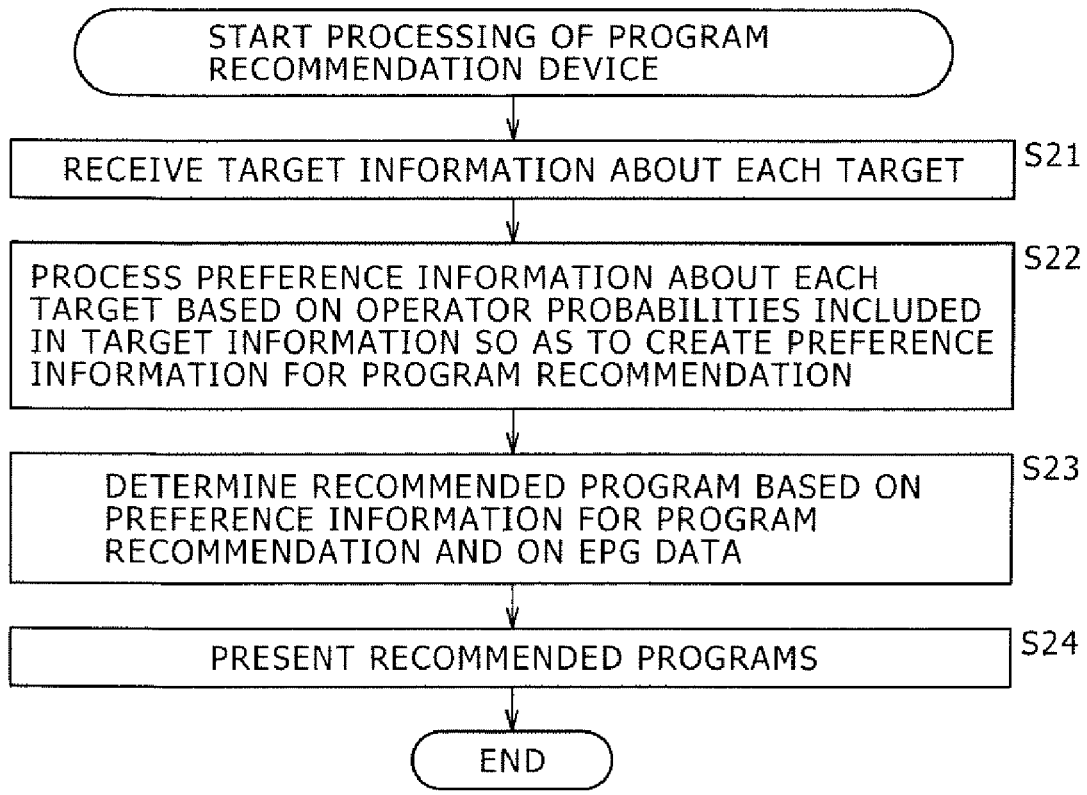
FIG. 3 is a flowchart of steps constituting a process performed by a program recommendation device.

Described below with reference to the flowchart of FIG. 3 is a process performed by the program recommendation device 15 shown in FIG. 1.

As described above, the target information acquisition device 13 acquires target information about each of at least one target near the HD recorder 3 and forwards the acquired information to the program recommendation device 15. The reference information processing device 62 in the program recommendation device 15 waits for the target information about each target to come from the target information acquisition device 13. Upon receipt of the target-specific target information from the target information acquisition device 13, the preference information processing device 62 goes to step S21. Step S21 is followed by step S22.

In step S22, the preference information processing device 62 creates program recommendation-intended preference information for recommending TV programs on the basis of the operator probabilities included in the target information coming from the target information acquisition device 13 and in accordance with the preference information about the targets (i.e., users) stored in the preference table held by the preference table storage device 61. The program recommendation-intended preference information thus created is supplied to the service offering device 63. Step S22 is followed by steps S23 and S24, in that order.

In steps S23 and S24, the service offering device 63 offers services recommending TV programs eased on the program recommendation-intended preference information supplied from the preference information processing device 62.

More specifically, the service offering device 63 in step S23 determines at least one TV program to be recommended to the target near the HD recorder 3 on the basis of both the program recommendation-intended preference information from the preference information processing device 62 and the EPG data held by the EPG storage device 33 in the TV device 12, before step S24 is reached.

In step S24, the service offering device 63 recommends the TV program or programs determined in step S23. That is, the service offering device 63 in step S24 illustratively creates a recommendation screen made up of the TV program listings determined to be recommended to the target in step S23. The recommendation screen thus created is sent to the output control device 34 for display on the display device 1.

Thereafter, the program recommendation device 15 returns to step S21 when the target information about each target is again supplied from the target information acquisition device 13. The subsequent steps are then repeated.

Frequent display of the recommendation screen on the display device 1 can disrupt the user's viewing of TV programs on the same device. This bottleneck can be bypassed by making arrangements for the recommendation screen to be displayed if recommendation screen display mode is in effect or if the user specifically requests display of the recommendation screen.

The program recommendation device 15 shown in FIG. 1, like the interaction device 14 in the same figure, may select the target with the highest operator probability as the operator and recommend at least one TV program matching the preference information about the selected operator, the information being used as program recommendation-intended preference information.

It is also possible for the program recommendation device 15 in FIG. 1 to create program recommendation-intended preference information out of the preference information about a plurality of targets and to recommend TV programs matching the program recommendation-intended preference information thus created.

Figure 4:
FIG. 4 is a tabular view showing a preference table.
Figure 5:
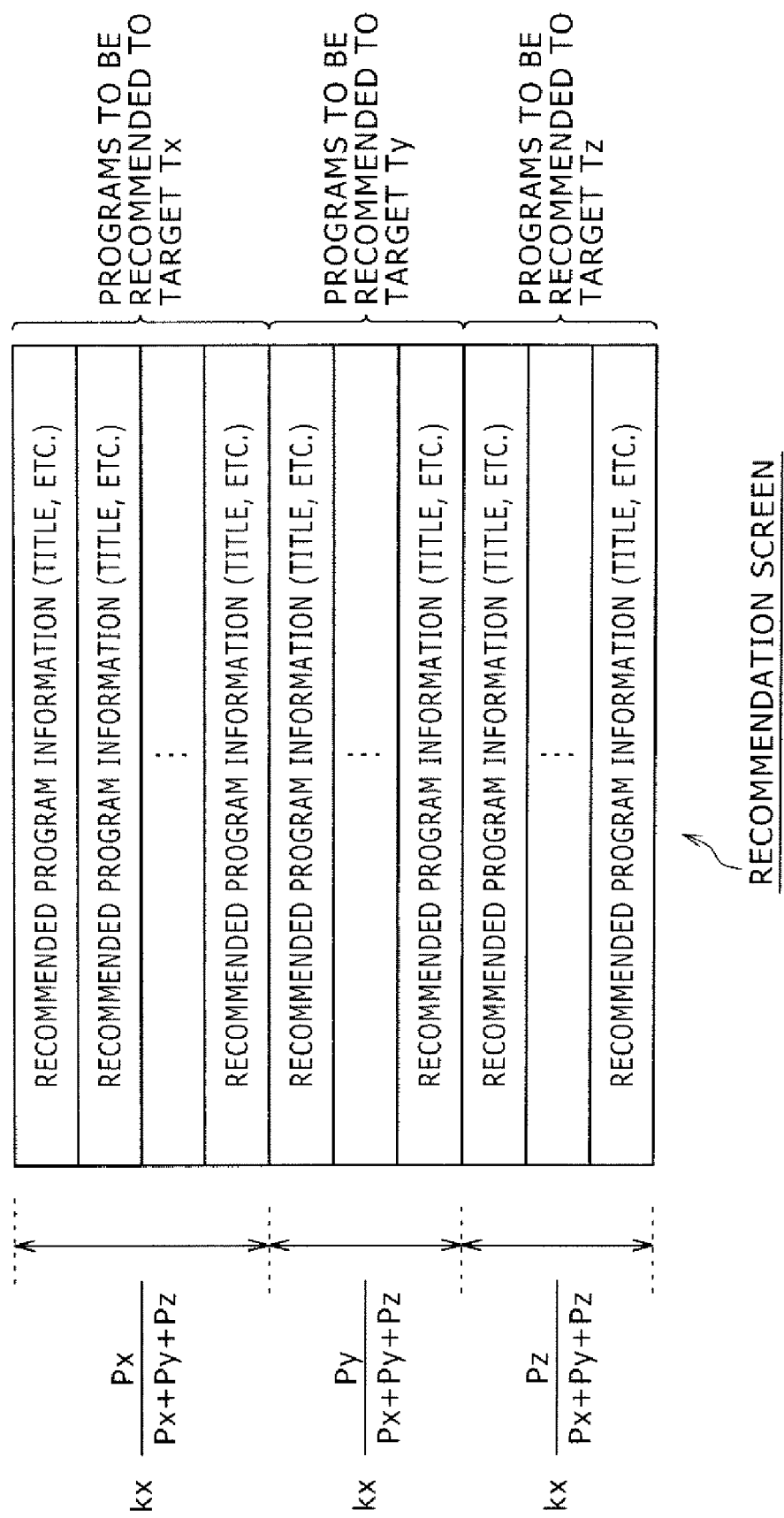
FIG. 5 is a schematic view showing a recommendation screen.

Described below with reference to FIGS. 4 and 5 are two methods for recommending TV programs that match the program recommendation-intended preference information created out of the preference information about multiple targets.

The two methods to be discussed below are preceded by the above-described method whereby the target with the highest operator probability is selected as the operator; whereby the selected operator's preference information is determined to be program recommendation intended preference information; and whereby at least one TV program matching the program recommendation-intended preference information thus determined is recommended. This method will be called the first recommendation method in the description that follows. Of the two methods about to be described involving creation of program recommendation-intended preference information out of the preference information about multiple targets and recommendation of TV programs matching the information thus created, one will be referred to as the second method and the other as the third method in the ensuing description.

FIG. 4 is a tabular view showing a preference table stored in the preference table storage device 61 of the program recommendation device 15 in FIG. 1.

In the preference table of FIG. 4, user labels $T_i$ (i=1, 2, ..., N) identifying N users as potential targets are associated with preference information $v_i$ representing the preferences of the users $T_i$ (identified by the user labels $T_i$).

In FIG. 4, the preference information $v_i$ is denoted by vectors having components representative of each user's varying degrees of preference for different categories (genres) of TV programs.

For purpose of simplification and illustration, it is assumed that there are N targets (i.e., users) $T_1, T_2, \ldots, T_N$ near the HD recorder 3. In this case, the target information acquisition device 13 supplies the program recommendation device 15 with target information about each of the N targets $T_i$, the target information including the operator probability $P_i$ representing how likely each of the targets $T_i$ is to be the operator.

According to the second recommendation method, the preference information processing device 62 in the program recommendation device 15 synthesizes program recommendation-intended preference information from the preference information $v_i$ about N targets $T_i$ on the basis of the operator probabilities $P_i$ included in the target information about these N targets $T_i$.

More specifically, the preference information processing device 62 weights the preference information $v_1, v_2, \ldots v_N$ about the N targets $T_1, T_2, \ldots, T_N$ with the operator probabilities $P_1, P_2, \ldots, P_N$ for the N targets $T_1, T_2, \ldots, T_N$. The weighted results $(P_1 \times v_1 + P_2 \times v_2 + \ldots P_N \times v_N)$ are supplied to the service offering device 63 as program recommendation-intended preference information.

At this point, the service offering device 63 determines a plurality of TV programs matching the program recommendation-intended preference information from the preference information processing device 62 by referencing the EPG data stored in the EPG storage device 33. The service offering device 63 then recommends the determined TV programs illustratively by displaying on the display device 1 a recommendation screen containing recommended program information such as program titles about the multiple TV programs determined.

According to the second recommendation method described above, TV programs matching the preferences of the targets with higher operator probabilities are more likely to be recommended.

According to the third recommendation method, the preference information processing device 62 creates program recommendation-intended preference information that combines the preference information $v_i$ about targets $T_i$ with the number of TV programs recommended on the basis of that preference information $v_i$ (the number may be called the recommendation count where appropriate). The targets $T_i$ are selected as those having the M highest operator probabilities $P_i$ out of N targets $T_i$ (N≦N) whose target information is supplied from the target information acquisition device 13.

Illustratively, it is assumed that the number M is "3," that targets $T_x$, $T_y$, and $T_z$ have the three highest operator probabilities $P_x$, $P_y$, and $P_z$ respectively, and that the targets $T_x$, $T_y$, and $T_z$ are assigned preference information $v_x$, $v_y$, and $v_z$ respectively. It is also assumed that up to a total of "k" TV programs can be listed as recommended program information on the recommendation screen.

In the case above, the preference information processing device 62 computes the value corresponding to the operator probability $P_x$ for the target $T_x$ as the number of TV programs to be recommended on the basis of the preference information $v_x$ about that target $T_x$. More specifically, the preference information processing device 62 computes the recommendation count $C_x = P_x \times k/(P_x + P_y + P_z)$ (fractions of $C_x$ are discarded) proportional to the operator probability $P_x$ for the target $T_x$, and has the computed recommendation count $C_x$ combined with the preference information $v_x$.

Likewise, as the number of TV programs to be recommended on the basis of the preference information $v_y$ about the target $T_y$, the preference information processing device 62 computes the recommendation count $C_y = P_y \times k/(P_x + P_y + P_z)$ proportional to the operator probability $P_y$ for the target $T_y$, and has the computed recommendation count $C_y$ combined with the preference information $v_y$. As the number of TV programs to be recommended on the basis of the preference information $v_z$ about the target $T_z$, the preference information processing device 62 computes the recommendation count $C_z = P_z \times k/(P_x + P_y + P_z)$ proportional to the operator probability $P_z$ for the target $T_z$, and has the computed recommendation count $C_z$ combined with the preference information $v_z$.

The preference information processing device 62 then supplies the combination of the recommendation count $C_x$ with the preference information $v_x$, combination of the recommendation count $C_y$ with the preference information $v_y$, and combination of the recommendation count $C_z$ with the preference information $v_z$ to the service offering device 63 as program recommendation-intended preference information.

In turn, the service offering device 63 references the EPG data stored in the EPG storage device 33 and thereby determines as many TV programs matching the preference information $v_x$ as the recommendation count $C_x$ combined with that information $v_x$ included in the program recommendation-intended preference information coming from the preference information processing device 62.

Likewise, the service offering device 63 determines as many TV programs matching the preference information $v_y$ as the recommendation count $C_y$ combined with that information $v_y$, and as many TV programs matching the preference information $v_z$ as the recommendation count $C_z$ combined with that information $v_z$.

The service offering device 63 then creates the recommendation screen such as one shown in FIG. 5. The service offering device 63 recommends the determined TV programs by having an appropriate recommendation screen displayed on the display device 1.

FIG. 5 is a schematic view showing a typical recommendation screen that may be created by the service offering device 63 according to the third recommendation method.

As shown in FIG. 5, the service offering device 63 creates a recommendation screen that may list, from the top down, recommended program information about as many TV programs as the recommendation count $C_x$ in keeping with the preference information $v_x$, recommended program information about as many TV programs as the recommendation count $C_y$ in keeping with the preference information $v_y$, and recommended program information about as many TV programs as the recommendation count $C_z$ in keeping with the preference information $v_z$.

According to the above-described third recommendation method, larger numbers of TV programs are recommended in regard to the targets with the higher operator probabilities.

The program recommendation device 15, as described above, may recommend TV programs to the target in accordance with any one of the first through the third method for recommending programs.

According to the first recommendation method, one target with the highest operator probability is selected as the operator. The preference information about the selected operator is used as program recommendation-intended preference information, and TV programs matching that information are recommended. In this manner, the TV programs in keeping with the preferences of one target with the highest operator probability are recommended.

According to the second recommendation method, program recommendation-intended preference information is synthesized from the preference information about a plurality of targets near the HD recorder 3 on the basis of the operator probabilities for these operators. TV programs are then recommended in keeping with the program recommendation-intended preference information thus created. This makes it possible to recommend TV programs not only to the target acting as the operator with the highest operator probability but also to other targets in consideration of their preferences. That is, TV programs that may draw the attention of targets other than the single target acting as the operator may be recommended.

According to the third recommendation method, program recommendation-intended preference information is created by combining the preference information about a plurality of targets near the HD recorder 3 with the recommendation counts corresponding to the operator probabilities for these targets. TV programs are then recommended in keeping with the program recommendation-intended preference information thus created. As with the second recommendation method, the third method makes it possible to recommend TV programs not only to the target acting as the operator with the highest operator probability but also to other targets in consideration of their preferences. TV programs that may potentially draw the attention of targets other than the single target acting as the operator can thus be recommended.

For example, suppose that the second or the third recommendation method is in use, that two targets are near the HD recorder 3, and that the two targets have the same operator probability of 100 (1.0). In this case, TV programs are recommended with the preferences of the two targets taken equally into consideration.

More specifically, according to the second recommendation method, program recommendation-intended preference information is acquired by synthesizing the preference information about the two targets near the HD recorder 3 using equal weights. TV programs are then recommended by giving equal consideration to the preferences of the two targets.

According to the third recommendation method, equal numbers of TV programs matching the preferences of each of the two targets near the HD recorder 3 are recommended.

Meanwhile, operator probabilities do not constitute ordinary nonlinear likelihood curves. That means they are highly suitable for computing weights (ratios) used to synthesize preference information about a plurality of targets. In that respect, operator probabilities can be applied to a wide range of synthesizing methods without being normalized or linearized.

The use of the operator probabilities makes it possible to recommend TV programs in consideration of the preference information about a plurality of targets and to offer other extensive services.

Although the above-described second recommendation method was shown to have program recommendation-intended preference information synthesized by assigning greater weights to the preference information about the targets with the higher operator probabilities, this is not limitative of the invention. Alternatively, program recommendation-intended preference information may be synthesized by assigning greater weights to the preference information about the targets with the lower operator probabilities. In the latter case, TV programs are recommended in a manner drawing the attention of the users who are little interested in the HD recorder 3.

Likewise, although the third recommendation method above was shown to get the preference information about the targets with the higher operator probabilities to combine with larger numbers of recommended TV programs, this is not limitative of the invention. Alternatively, the preference information about the targets with the lower operator probabilities may be combined with larger numbers of recommended TV programs. In the latter case, TV programs are also recommended in such a manner as to draw the attention of the users who are little interested in the HD recorder 3.

Which of the first through the third recommendation methods is to be used by the program recommendation device 15 to recommend TV programs may be determined illustratively by users' settings. It should be noted that the methods for recommending TV programs are not limited to the above-described first through the third method.

Figure 6:
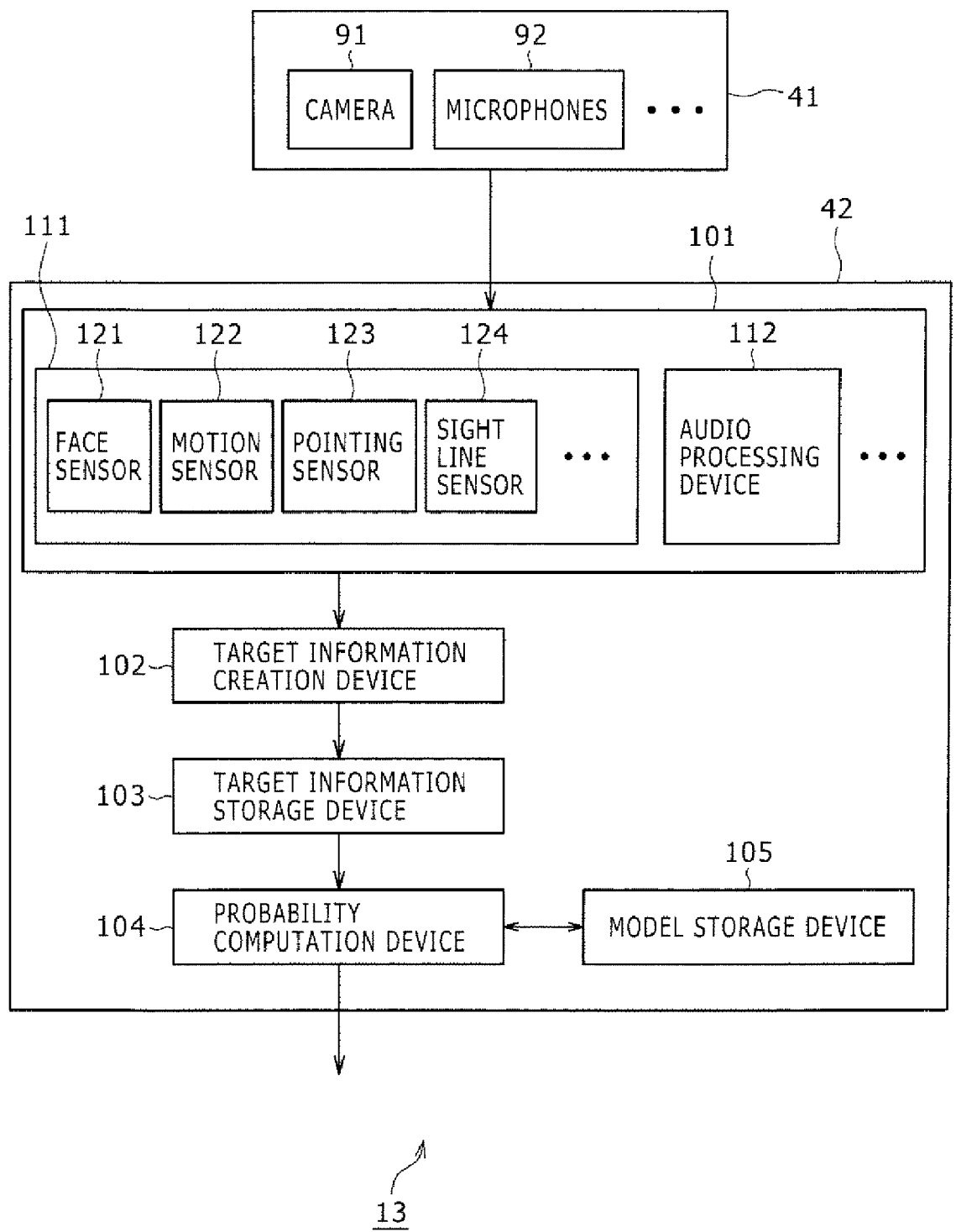
FIG. 6 is a block diagram showing a typical structure of a target information acquisition device.

FIG. 6 is a block diagram showing a typical structure of the sensor device 41 and operator probability computation device 42 in the target information acquisition device 13.

The sensor device 41 is made up of a camera 91, a microphone 92, and other sensors. In operation, the sensor device 41 senses conditions and outputs resulting sensor signals to the operator probability computation device 42.

More specifically, the camera 91 senses optical conditions and outputs the resulting video data as its sensor signal. The microphone 92 senses acoustic conditions and outputs the resulting audio data as its sensor signal.

The sensor device 41 may optionally include an infrared sensor for sensing infrared radiation.

The operator probability computation device 42 is constituted by an information extraction device 101, a target information creation device 102, a target information storage device 103, a probability computation device 104, and a model storage device 105. In operation, the operator probability computation device 42 acquires target information about the behavior, gestures, etc., of targets near the HD recorder 3 on the basis of the sensor signals coming from the sensor device 41. Furthermore, the operator probability computation device 42 computes an operator probability representing how likely each of the targets near the HD recorder 3 is to be the operator on the basis of the target information obtained from the sensor signals supplied by the sensor device 41. The operator probabilities thus computed are included in the target information before they are output.

The information extraction device 101 is composed of an image processing device 111, an audio processing device 112, and other signal processing devices for processing sensor signals. From the sensor signals supplied by the sensor device 41, the information extraction device 101 extracts information about each of at least one target near the HD recorder 3 and feeds the extracted information to the target information creation device 102.

The image processing device 111 is made up of a face sensor 121, a motion sensor 122, a pointing sensor 123, a sight line sensor 124, and other sensors or recognition units. In operation, the image processing device 111 processes video data in the sensor signals fed by the sensor device 41, extracts from the video data a variety of information about the targets near the HD recorder 3, and sends the extracted information to the target information creation device 102.

More specifically, the face sensor 121 senses an area inside the image containing the faces of targets out of the video data coming from the sensor device 41. From the sensed area in the image, the face sensor 121 acquires the direction, position, and size of each face and supplies what is acquired to the target information creation device 102.

The face sensor 121 also recognizes the faces of the targets from the video data supplied by the sensor device 41. Following the face recognition, the face sensor 121 supplies user labels identifying the users to the target information creation device 102. The user labels resulting from the face recognition by the face sensor 121 are used illustratively to identify the preference information about the targets with their faces recognized out of the preference information placed in the preference table held by the preference table storage device 61 in the program recommendation device 15 of FIG. 1.

From the video data supplied by the sensor device 41, the motion sensor 122 extracts the direction in which each target is moving (direction of motion), the amount of the motion, and the position of the origin of a motion vector representing the motion of the target in question (position of motion). What is extracted is then sent to the target information creation device 102.

From the video data supplied by the sensor device 41, the pointing sensor 123 senses whether a given target is making a pointing gesture. If the target is found making a pointing gesture, then the pointing sensor 123 senses the direction in which the target is pointing (pointing direction) and the position of the hand doing the pointing (pointing position) and feeds what is sensed to the target information creation device 102.

From the video data sent by the sensor device 41, the sight line sensor 124 senses the direction of the line of sight of the target (sight line direction) and supplies what is sensed to the target information creation device 102.

With ordinary interaction devices, diverse image processing algorithms are used to extract information deemed useful for user estimation from the input image. In like manner, the image processing device 111 can extract diverse information from the input image.

If the camera 91 in the image processing device 111 is a so-called stereo camera, it can extract depth information.

The audio processing device 112 processes audio data in the sensor signals coming from the sensor device 41, extracts from the audio data a variety of information about the targets near the HD recorder 3, and sends the extracted information to the target information creation device 102.

More specifically, the audio processing device 112 may recognize the voice of each target using a voice recognition unit. Following the voice recognition, the audio processing device 112 may acquire information about the phonemes and rhythms of the target's voice. The audio processing device 112 may also obtain the direction in which the target is talking (i.e., talking direction) using a sound source direction recognition unit.

If the sensor device 41 is furnished with an infrared sensor as mentioned above, the information extraction device 101 includes a corresponding signal processing device. When installed, this signal processing device processes the output of the infrared sensor, picks up temperatures at different portions of a given target, and feed the extracted temperature information to the target information creation device 102.

The sensors to be included in the sensor device 41 may be combined with any signal processing device in the information extraction device 101 as long as the combination is capable of obtaining integral information about each target.

The target information creation device 102 receives information from the information extraction device 101 and arranges the received information into target information about each target.

More specifically, given the information from the information extraction device 101, the target information creation device 102 determines the number of targets near the HD recorder 3 (it also determines whether there is any target near the HD recorder 3). Furthermore, the target information creation device 102 determines which of the targets is covered by the information received from the information extraction device 101, and organizes by target the information coming from the information extraction device 101 to create target-specific target information (i.e., target information about each of all targets recognized).

The target information creation device 102 creates target information at predetermined intervals in the manner described above. The target information is then supplied chronologically from the target information creation device 102 to the target information storage device 103.

The process of organizing information by target as discussed above may be carried out using the so-called short term memory (STM) scheme common to interaction devices.

There exist diverse STM techniques for organizing target-specific information using positional and temporal information about the input resulting from recognition (sensing) processes. Illustratively, there is an STM technique involving the use of the closeness of sensed positions and predicted points of motion past differential times. However, the types of STM techniques that may be used by the target information creation device 102 are not subject to particular constraints as long as they can organize information about recognized results from each of the targets found within the range observable by the HD recorder 3.

The target information storage device 103 temporarily stores the target-specific target information supplied chronologically by the target information creation device 102.

The probability computation device 104 computes an operator probability representing how likely each of the targets is to be the operator using a model stored in the model storage device 105 and in accordance with the target information held by the target information storage device 103. The operator probabilities thus computed are included in the target-specific target information before they are output.

More specifically, the probability computation device 104 may utilize a stochastic reasoning computation model such as the Bayesian network (BN) when computing operator probabilities for each target by inputting into the BN diverse information (called component information where appropriate) constituting the target information stored in the target information storage device 103.

Meanwhile, the Bayesian network comes in two major types: a static Bayesian network (SBN) for performing probabilistic computations using single-time information, and a dynamic Bayesian network (DBN) for executing (reasoning) probabilistic computations using all-time information preserved from the past. There are more BN ramifications coming under the static and dynamic Bayesian networks. Any of these BN models may be used to compute operator probabilities.

The model for use in computing operator probabilities may be any model as long as it suitable for reasoning the probability of a given target being the operator when relevant component information is acquired out of the target-specific target information. In that respect, the model is not limited to any one of the BN variations.

The model storage device 105 stores models for use by the probability computation device 104 in computing operator probabilities. Typically, the above-outlined BN models are retained in the model storage device 105.

The processing by the image processing device 111 shown in FIG. 6 is explained below in more detail by referring to FIGS. 7 through 9.

Figure 7:
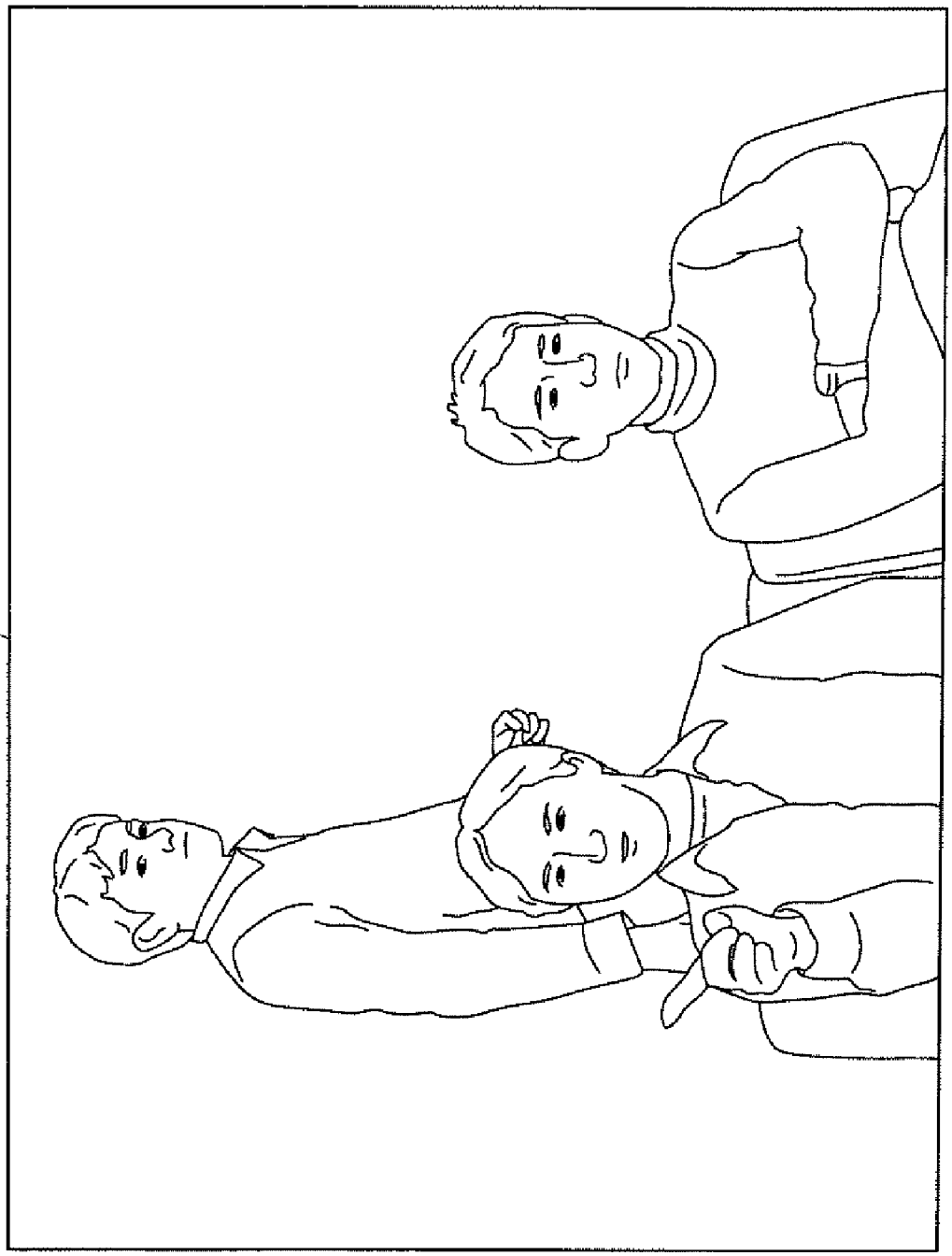
FIG. 7 is a schematic view explanatory of processing by an image processing device.

FIG. 7 shows a typical image taken by the camera 91.

The image of FIG. 7 shows three users as targets. More specifically, two targets are shown sitting in the foreground while one target is shown walking from left to right in the background.

Figure 8:
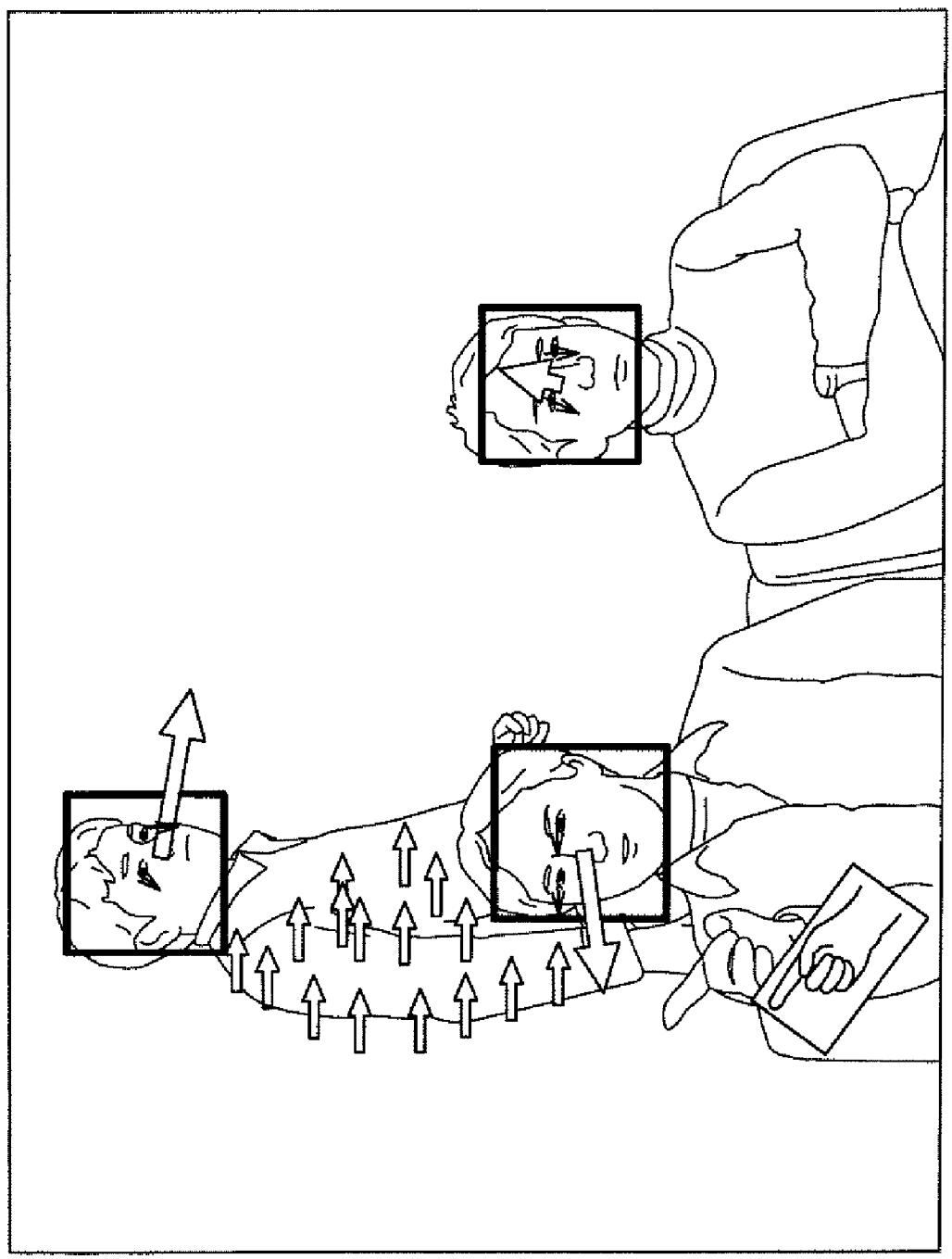
FIG. 8 is another schematic view explanatory of the processing by the image processing device.
Figure 9:
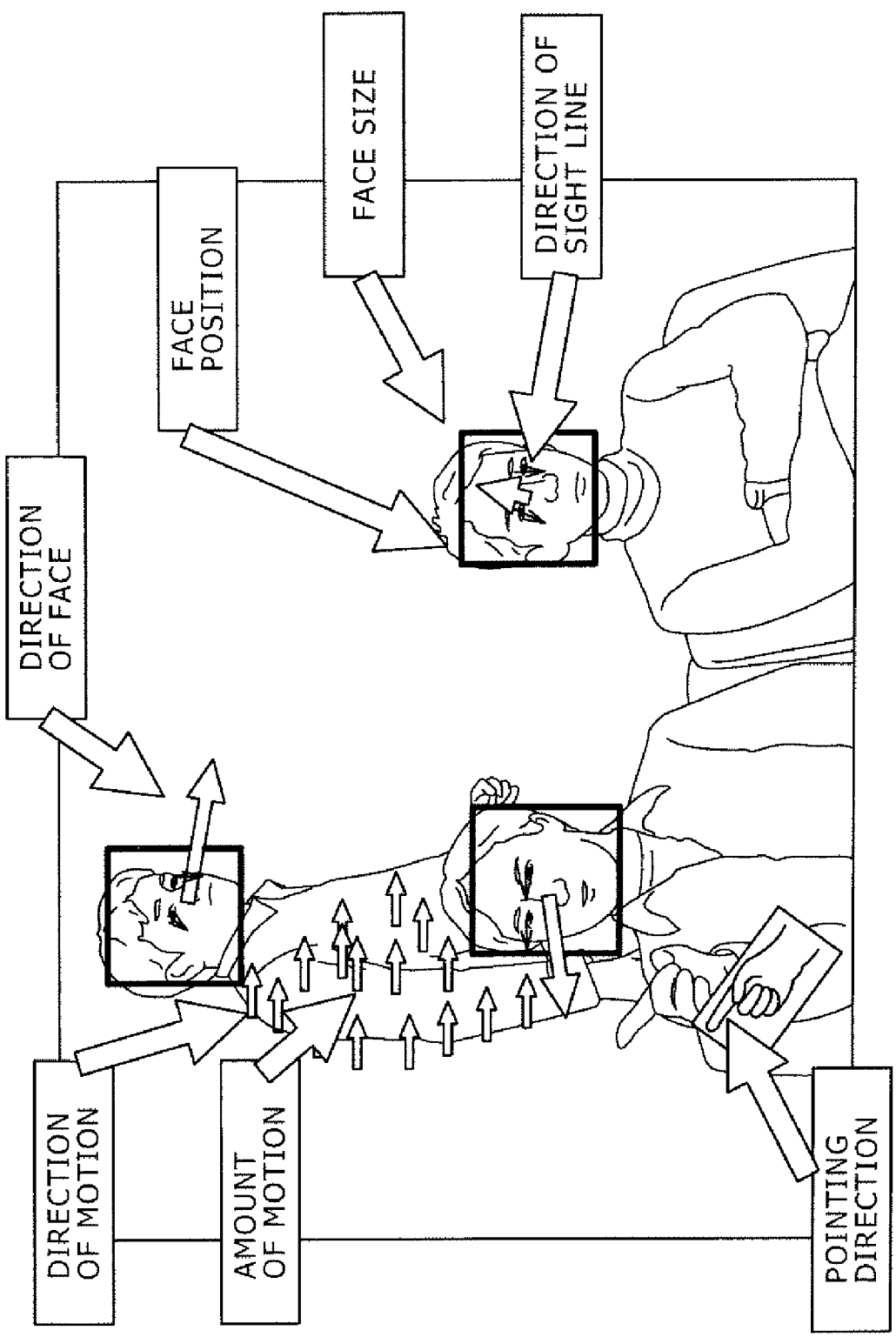
FIG. 9 is another schematic view explanatory of the processing by the image processing device.

FIGS. 8 and 9 indicate information that may be extracted from the image of FIG. 7 by the image processing device 111.

Illustratively, from the image in FIG. 7 showing three targets, the image processing device 111 extracts part or all of such information as the direction of face, face position, face size, direction of motion, amount of motion, pointing direction, and direction of sight line, as depicted in FIGS. 8 and 9.

Figure 10:
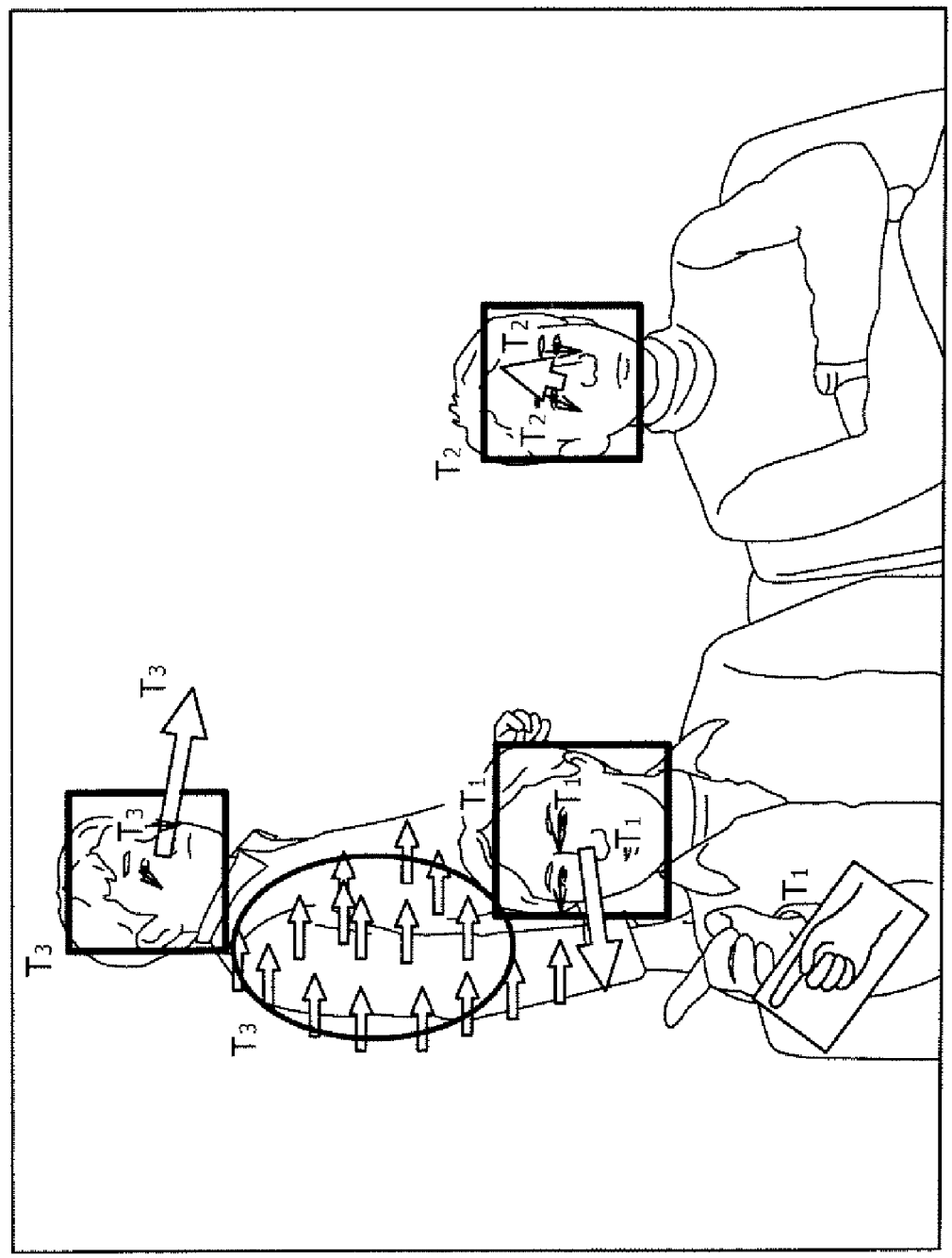
FIG. 10 is a schematic view explanatory of processing by a target information creation device.

The processing by the target information creation device 102 in FIG. 6 is described below in more detail by referring to FIG. 10.

Illustratively, suppose that the items of information shown in FIGS. 8 and 9 are extracted by the information extraction device 101 from the image of FIG. 7 containing three targets and that the extracted information is supplied to the target information creation device 102. In this case, the target information creation device 102 determines to which of the three targets in FIG. 7 the items of information indicated in FIGS. 8 and 9 belong. Based on the result of the determination, the target information creation device 102 creates target information in which the items of information in FIGS. 8 and 9 are suitably organized for each of the three targets in FIG. 7, as shown in FIG. 10.

As described above, the target information creation device 102 chronologically creates target information about each target and feeds the created target information in chronological order to the target information storage device 103 (FIG. 6).

Figure 11:
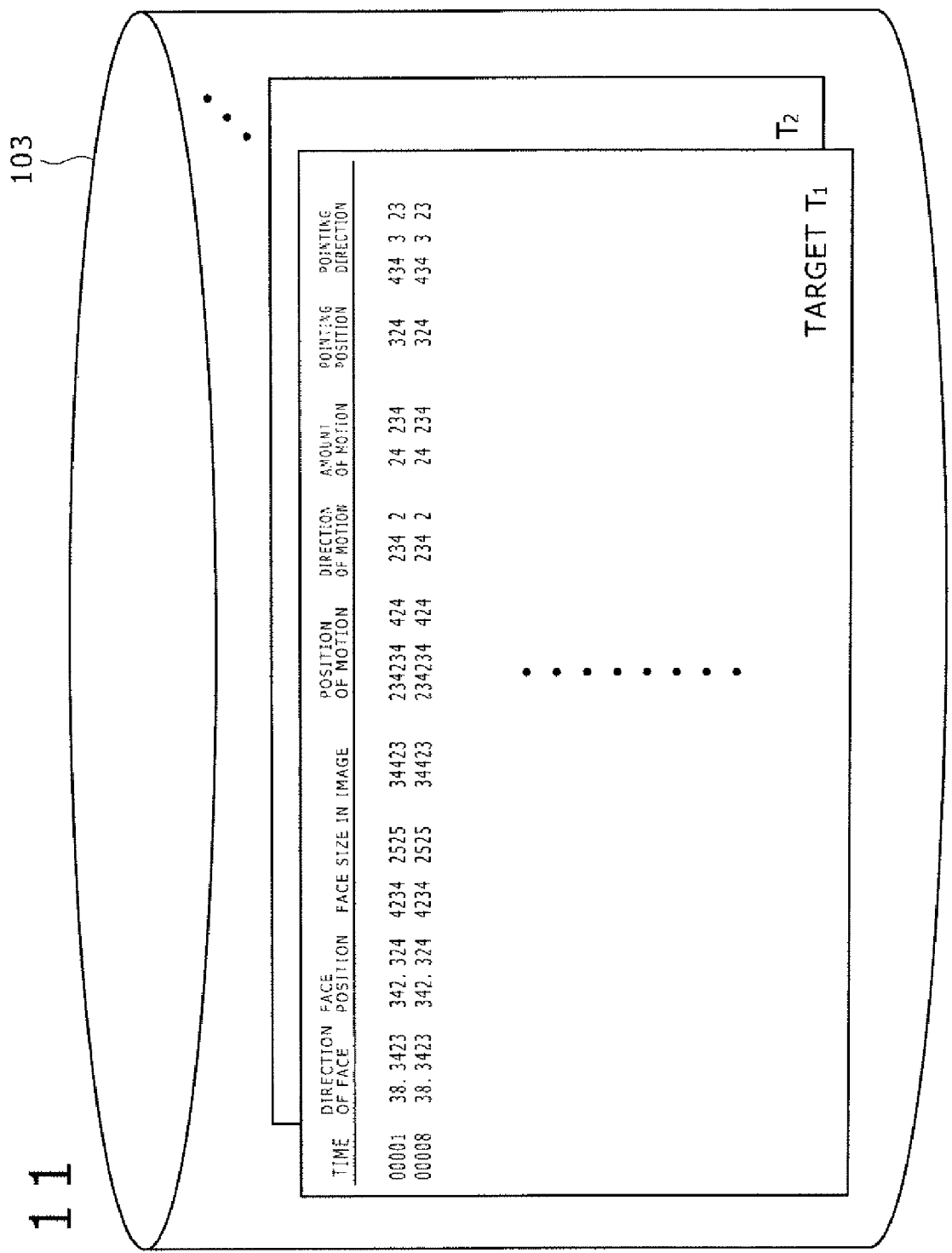
FIG. 11 is a schematic view showing what is contained in a target information storage device.

FIG. 11 is a schematic view showing what is contained in the target information storage device 103 in FIG. 6.

As shown in FIG. 11, the target information storage device 103 stores for each of the targets involved target information with its components covering such items as the direction of face, face position, face size, direction of motion, amount of motion, pointing directions and direction of sight line. The target information is received chronologically from the target information creation device 102 by the target information storage device 103 for storage therein.

Figure 12:
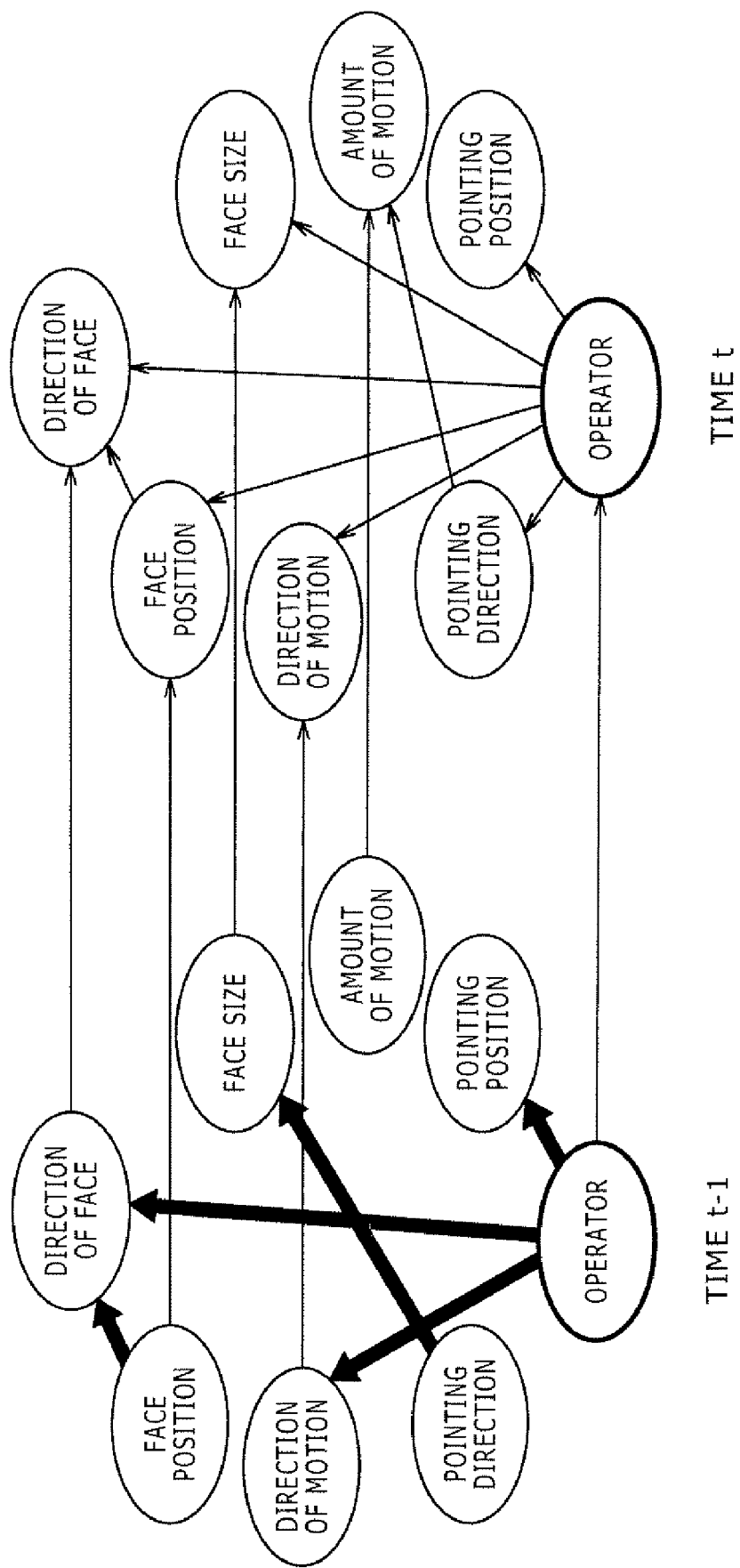
FIG. 12 is a schematic view showing a Bayesian network (BN) model used to compute operator probabilities.

FIG. 12 is a schematic view showing a Bayesian network (BN) model used by the probability computation device 104 in FIG. 6 in computing operator probabilities. This model is stored in the model storage device 105.

What is shown in FIG. 12 is a dynamic Bayesian network (DBN) model for computing operator probabilities (called the operator probability computation BN below where appropriate).

The operator probability computation EN in FIG. 12 has nodes that correspond to component information (potentially) constituting target information. For purpose of simplification and illustration, FIG. 12 indicates seven nodes corresponding to a total of seven components of target information, including direction of face, face position, face size, direction of motion, amount of motion, pointing direction, and direction of sight line.

The operator probability computation BN further includes an operator node indicating that a given target is the operator. This node, in addition to the nodes representing the components of target information, is used to compute the probability of the target being the operator (i.e., operator probability).

As long as it has the component nodes and the operator node, the operator probability computation BN may optionally include other nodes such as hidden nodes or those representative of the conditions of the HD recorder 3.

A typical node denoting the conditions of the HD recorder 3 may be one which indicates whether or not a DVD is loaded in the HD recorder 3. When the HD recorder 3 is not loaded with a DVD, it is unlikely for any user to perform operations for writing or reading data to or from the DVD. Thus the use of the node indicating whether or not a DVD is loaded in the HD recorder 3 contributes to reducing the operator probability of any user who makes gestures for giving instructions to write or read data to or from the DVD.

The operator probability computation BN in FIG. 12 has two Bayesian networks: a BN made up of component in Formation nodes and an operator node about a time "t" (current time), and a BN constituted by component information nodes and an operator node about a time "t−1," one time interval earlier than the current time.

In the operator probability computation BN of FIG. 12, thick-line arrows connecting some nodes represent a prior network and thin-line arrows represent a transition network.

In FIG. 12, the relations between the BN made of the component information nodes and operator node about the time "t" on the one hand, and the BN formed by the component information nodes and operator node about the time "t−1" on the other hand can also be applied to the relations between the BN composed of the component information nodes and operator node about the time "t−1" on the one hand, and the BN constituted by the component information nodes and operator node about the time "t−2" on the other hand. For this reason, the operator probability computation BN in FIG. 12 may have an extended BN established on the left-hand side (past side) of the BN made of the component information nodes and operator node about the time "t−1," the extended BN being formed by component information nodes and an operator node about a time "t−2."

The operator probability computation BN in FIG. 12 may have more extended BN's established in like manner, each extended BN being made of similar component information nodes and an operator node about a farther past time. If the operator probability computation BN has more BN's extended up to the one constituted by component information nodes and an operator node about a past time "t−T," then the component information in the target information ranging from the time "t−T" to the current time "t" is assigned to the corresponding component information nodes, and the operator probabilities ranging from the time "t−T" to the time "t−1" are given to the corresponding operator nodes. This makes it possible to induce the information corresponding to the operator node about the current time "t," i.e., information representing the operator probability at the current time "t."

The operator probability at the current time "t" can be computed without having to feed all component information in the target information ranging from the time "t−T" to the current time "t" and all operator probabilities ranging from the time "t−T" to the time "t−1." That is, with the BN model in use, the operator probability at the current time "t" can be computed using part of all component information in the target information ranging from the time "t−T" to the current time "t" and part of all operator probabilities ranging from the time "t−T" to the time "t−1."

The inference algorithms for inferring information based on the static BN model illustratively include the Pearl $\pi\lambda$ message passing algorithm and the junction tree algorithm whereby an exact solution can be obtained. Also included are the loopy BP and the cluster BP whereby an approximate solution is acquired at high speed using the static BN. The inference algorithms for inferring information based on the dynamic BN (DBN) illustratively include the 1.5 junction tree algorithm and the Boyen-Koller inference algorithm, the latter algorithm being an application of the former. The 1.5 junction tree algorithm permits acquisition of an exact solution while the Boyen-Koller inference algorithm allows an approximate solution to be obtained at high speed.

The BN model containing the operator probability computation BN is defined by a network structure and a parameter called a conditional probability table (CPT).

The network structure and the CPT defining the operator probability computation BN need to be carefully established because they can significantly affect the operator probabilities to be acquired by the probability computation device 104 (FIG. 6).

Illustratively, the network structure and the CPT may be established manually by designers of the HD recorder 3. Alternatively, the network structure and the CPT may be acquired through learning by use of learning data prepared for the purpose.

Figure 13:
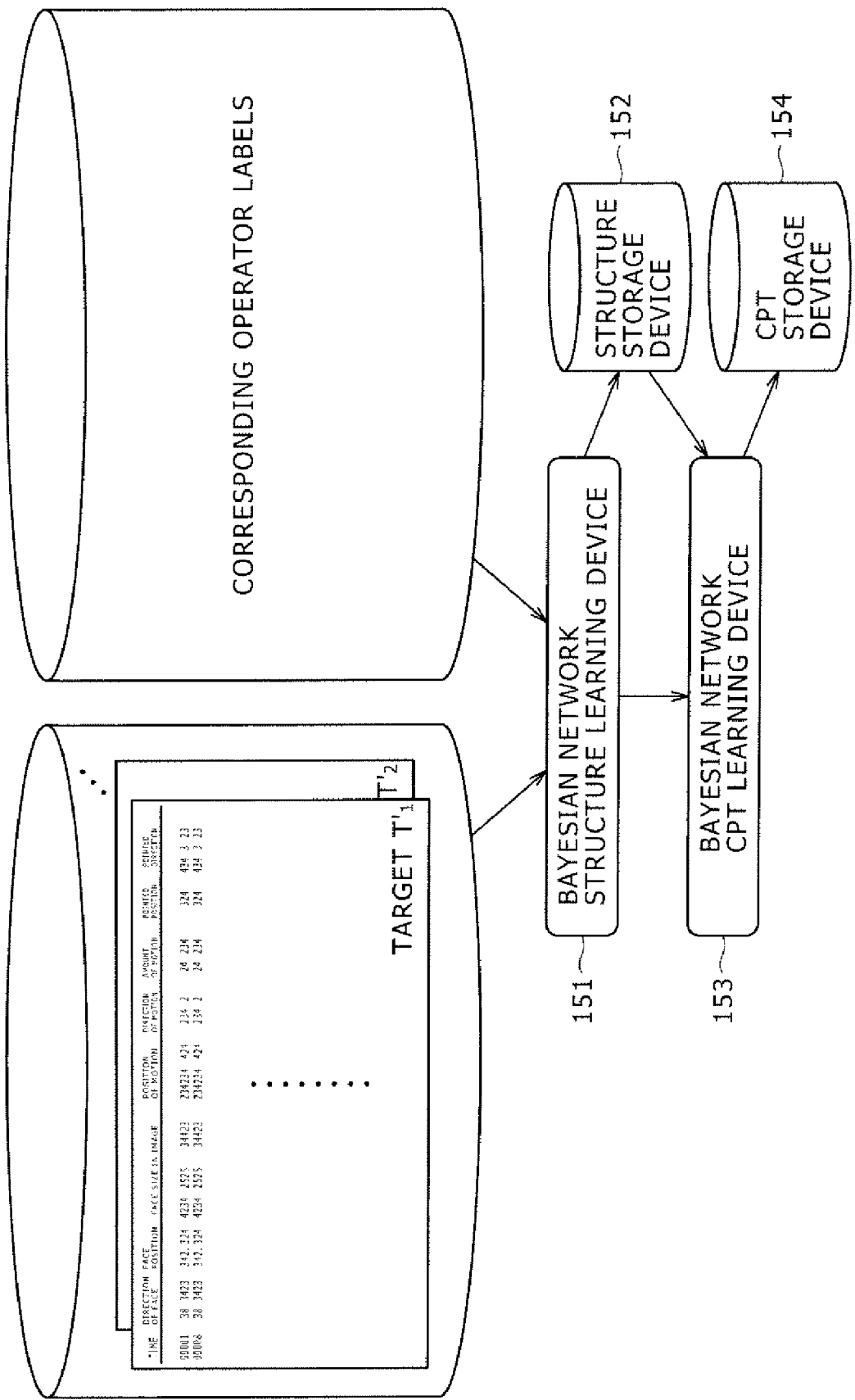
FIG. 13 is a schematic view showing typical structures of a learning apparatus for acquiring a network structure and a conditional probability table (CPT) through learning.

FIG. 13 is a schematic view showing typical structures of a learning apparatus for acquiring the network structure and the conditional probability table (CPT) through learning.

In FIG. 13, the learning apparatus is constituted by a structure learning device 151, a structure storage device 152, a CPT learning device 153, and a CPT storage device 154.

The structure learning device 151 is supplied with learning data.

The learning data is formed by combinations of target information with operator labels, the target information being the same as what is created by the target information creation device 102 in FIG. 6. The learning data is collected as follows:

A sensor device similar to the sensor device 41 is used to sense the behavior of a large number of people acting as targets. From the result of the sensing, an information extraction device similar to information extraction device 101 and a target information extraction device similar to the target information creation device 102 acquire target information making up the learning data.

When the target information constituting the learning data is obtained from the behavior of the targets each acting as the operator, the target information is associated with target labels identifying each target acting as the operator. If the target information is acquired from any other behavior or gestures, the acquired information is associated with target labels indicating that each target is not the operator.

The structure learning device 151 supplies the component information in the target information making up the learning data to the corresponding component information nodes in the operator probability computation BN (FIG. 12), and gives the target label associated with the target information to the operator node. In so doing, the structure learning device 151 obtains the network structure for use in the operator probability computation BN and feeds the obtained structure to the structure storage device 152 for storage therein.

The structure learning device 151 supplies the CPT learning device 153 with the learning data used to acquire the network structure for the operator probability computation BN.

The CPT learning device 153 acquires the CPT based on the network structure stored in the structure storage device 152 and on the learning data coming from the structure learning device 151, and supplies the acquired CPT to the CPT storage device 154 for storage therein.

The model storage device 105 in FIG. 6 stores the operator probability computation BN defined by the network structure held in the structure storage device 152 and by the CPT kept in the CPT storage device 154.

The probability computation device 104 in FIG. 6 obtains the operator probability for each target using the operator probability computation BN stored in the model storage device 105 as well as the target-specific target information sent from the target information storage device 103.

Figure 14:
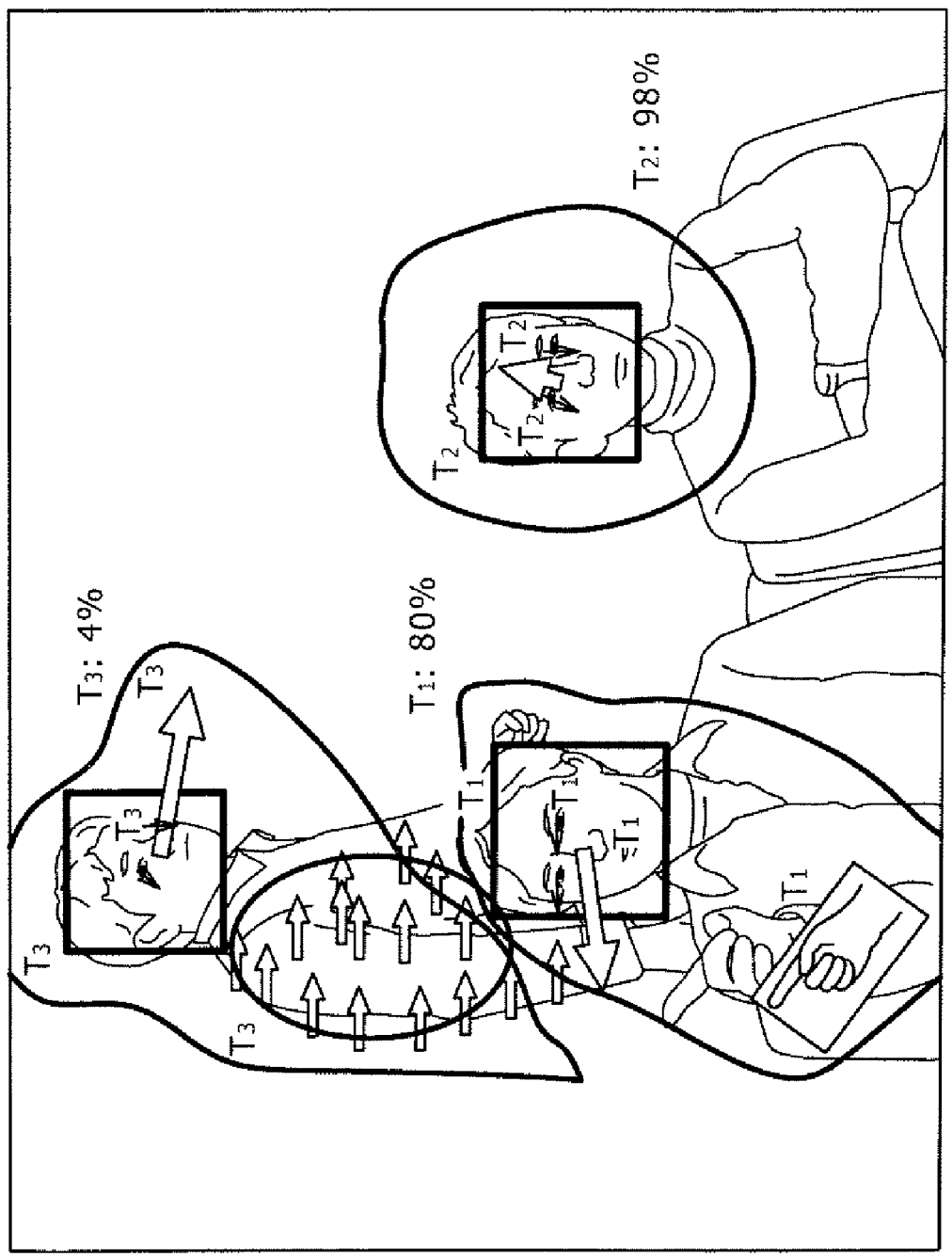
FIG. 14 is a schematic view showing typical operator probabilities for the targets being imaged.

FIG. 14 is a schematic view showing typical operator probabilities acquired for the three targets being imaged in FIG. 7.

In the image of FIG. 7, two targets are shown sitting in the foreground with one target walking in the background as discussed above. It is assumed here that one of the two targets in the foreground sitting on the left is referred to as a target $T_1$, the other setting target as a target $T_2$, and the target walking in the background as a target $T_3$. In FIG. 14, the obtained operator probability is illustratively 80 (0.80) for the target $T_1$, 98 (0.98) for the target $T_2$, and 4 (0.04) for the target $T_3$.

In the case above, the operator selection device 51 in the interaction device 14 of FIG. 1 selects the target $T_2$ as the operator having the highest operator probability of 98 out of the three targets $T_1$, $T_2$, and $T_3$. The user can thus become the operator without having to perform complicated actions such as saying "I am the user."

In other words, where there are at least two users who can be targets, there is no need for them to carry out elaborate actions for switching the role of the operator. The procedure of one user taking over from another as the new operator is thus effected in seamless fashion.

In the above example, the interaction device 14 was shown selecting the target with the highest operator probability as the operator. Alternatively, at the design stage of the HD recorder 3, it is possible to establish a threshold level against which the operator probability of a given target potentially becoming the operator may be checked. In this case, the interaction device 14 may select as the operator any target having an operator probability exceeding the established threshold level. The interaction device 14 may then select the action to be performed by the HD recorder 3 depending on the number of targets selected as the operator each.

Furthermore, since operator probabilities are susceptible to computing ratios, the HD recorder 3 may take advantage of such ratios in offering flexible services.

Figure 15:
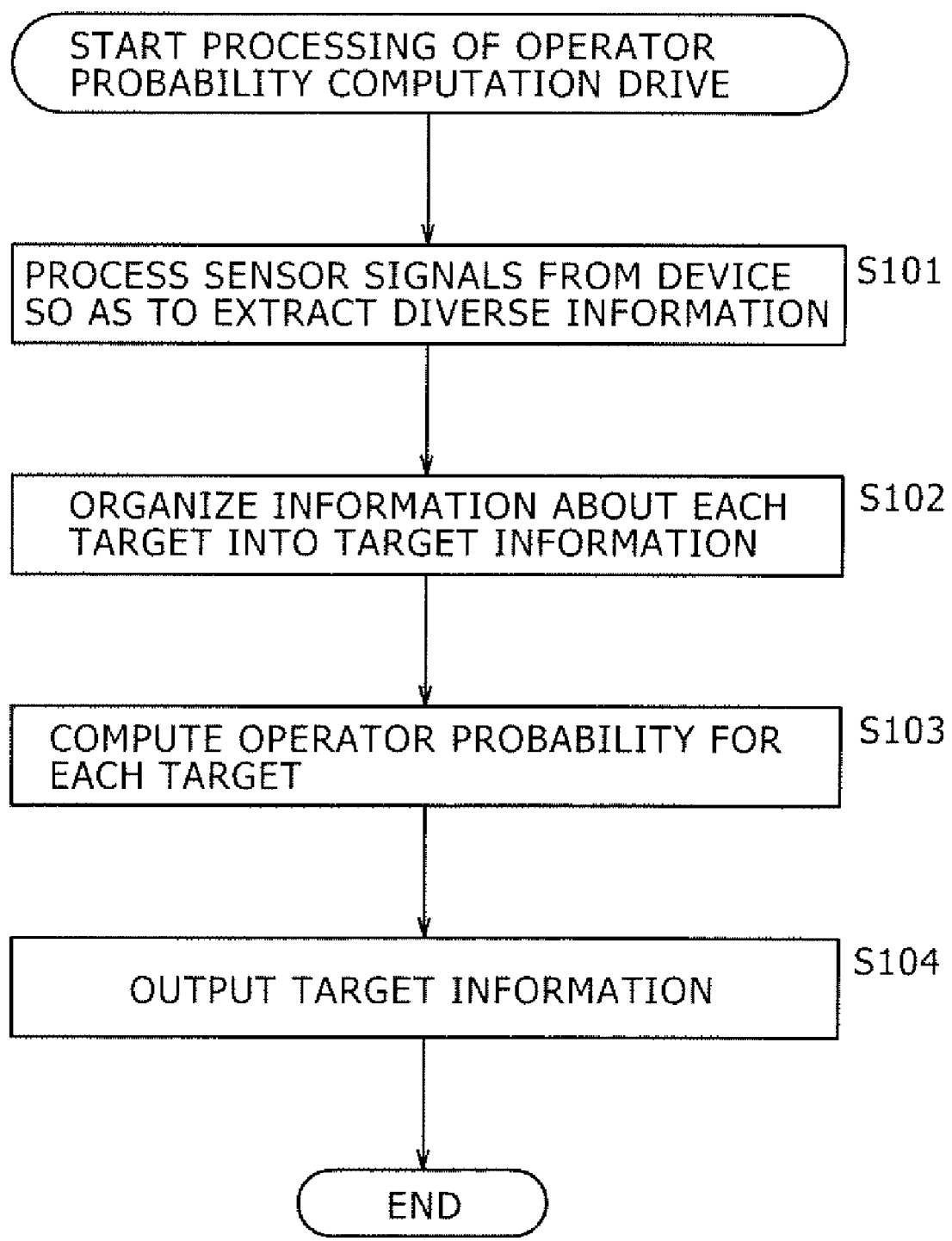
FIG. 15 is a flowchart of steps constituting a process performed by an operator probability computation device.

Illustratively, the program recommendation device 15 in FIG. 15 may set the operator probability threshold to 50. In this case, every target with an operator probability in excess of that threshold level is selected as the operator so that TV programs in consideration of the preference of the selected operator may be recommended.

More specifically, as shown in FIG. 14, if the operator probability is 80 for the target $T_1$, 98 for the target $T_2$ and 4 for the target $T_3$, and if the threshold level is set to 50, then the program recommendation device 15 selects as operators the targets $T_1$ and $T_2$ with their operator probabilities exceeding the threshold (50).

Furthermore, the program recommendation device 15 synthesizes the preference information about the target $T_1$ and the preference information about the target $T_2$ using the ratio of 80 to 98 based on the operator probability of 80 for the target $T_1$ and 98 for the target $T_2$. The program recommendation device 15 then recommends TV programs in keeping with program recommendation-intended preference information derived from the synthesis. In this case, it is possible to recommend TV programs that are more in line with the current situation (i.e., TV programs matching the preferences of the targets $T_1$ and $T_2$ manifesting their willingness to become the operators).

Described below in reference to the flowchart of FIG. 15 is a process performed by the operator probability computation device 42 in FIG. 6.

The sensor device 41 outputs sensor signals at predetermined intervals to the operator probability computation device 42. With the sensor signals sent from the sensor device 41, the operator probability computation device 42 receives the signals and forwards them to the information extraction device 101.

In step S101, the information extraction device 101 processes the sensor signals from the sensor device 41 and extracts information about the targets near the HD recorder 3 from the processed signals. The extracted information is sent to the target information creation device 102, before step S102 is reached.

In step S102, the target information creation device 102 creates target-specific target information illustratively through STM out of the information supplied by the information extraction device 101. The created target information is fed to the target information storage device 103 for storage therein, before step S103 is reached.

In step S103, the probability computation device 104 computes the operator probability for each target by feeding (inputting) the target-specific target information held by the target information storage device 103 into the operator probability computation BN stored in the model storage device 105. Step S103 is followed by step S104.

In step S104, the probability computation device 104 causes the target-specific operator probability obtained in step S103 to be included in the target information about the respective targets, before outputting the target-specific target information together with the operator probabilities.

Thereafter, every time new sensor signals are output illustratively from the sensor device 41, steps S101 through S104 are carried out.

Figure 16:
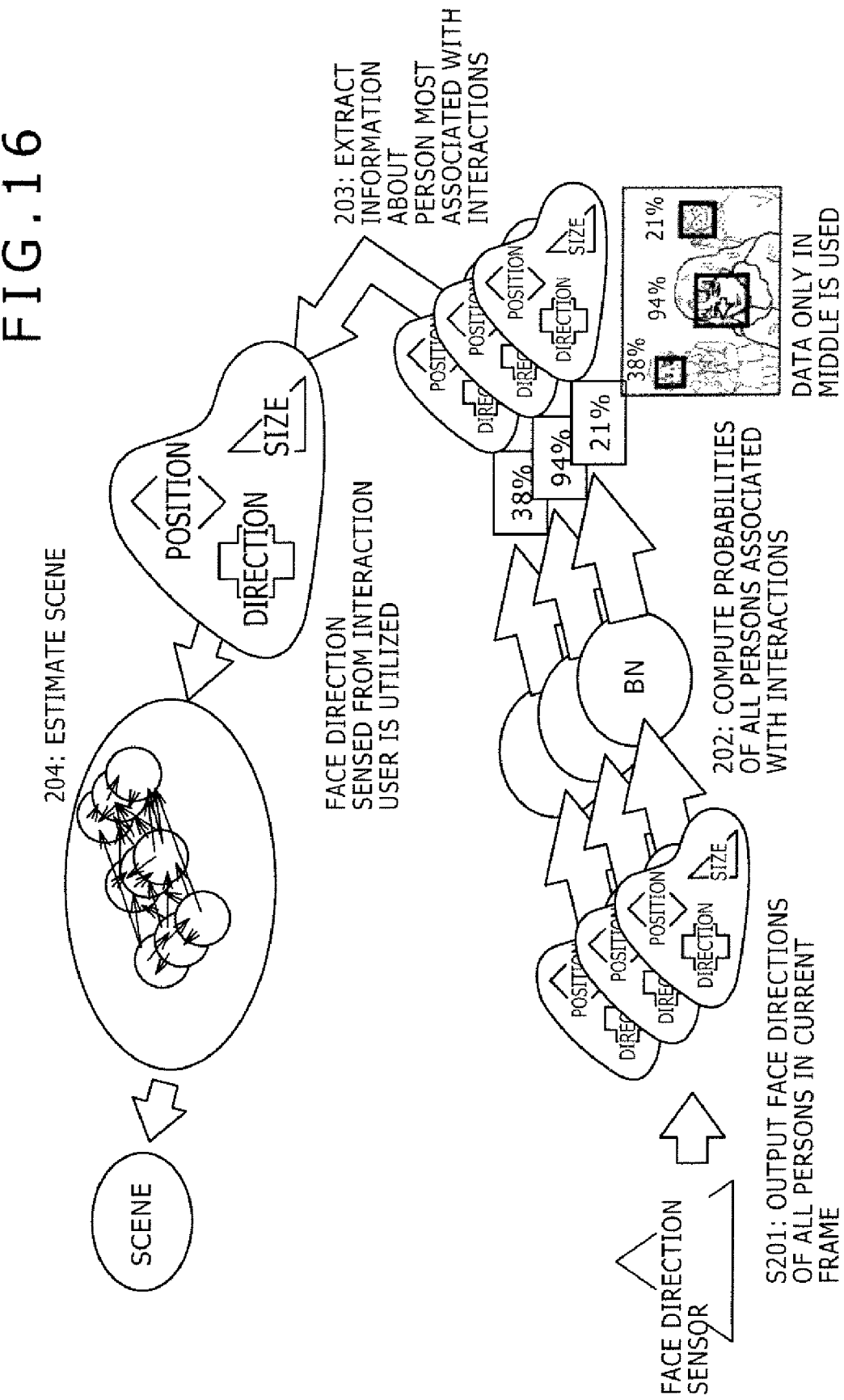
FIG. 16 is a schematic view explanatory of an outline of what a hard disk (HD) recorder does.

The processing by the HD recorder 3 in FIG. 1 will now be outlined by referring to FIG. 16.

In step S201, the operator probability computation device 42 extracts information (e.g., direction of face and other items) about each of the targets near the HD recorder 3 from the sensor signals output by the sensor device 41, and organizes the extracted information into target information about each target.

In step S202, the operator probability computation device 42 computes the operator probability for each target by feeding the target-specific target information into the operator probability computation BN. The operator probability computation device 12 causes the operator probability thus computed for each target to be included in the target information about the respective targets, before outputting the target-specific target information together with the operator probabilities.

In step S203, the interaction device 14 illustratively selects as the operator the target having the highest operator probability contained in the target-specific target information output by the operator probability computation device 42. The interaction device 14 proceeds to extract the target information about the operator from the target-specific target information output by the operator probability computation device 42.

In step S204, the interaction device 14 estimates the scene of the operator (i.e., scene in which the operator behaved in a particular manner) based on the target information about the operator. In accordance with the result of the estimation, the interaction device 14 determines the action to be performed by the HD recorder 3. The interaction device 14 proceeds to make arrangements for the action to be carried out.

The series of steps or processes performed by the above-described operator probability computation device 42, interaction device 14, and program recommendation device 15 may be executed either by hardware or by software. For the software-based processing to take place, the programs constituting the software may be either incorporated beforehand in dedicated hardware of a computer for program execution or installed upon use into a general-purpose personal computer or like equipment capable of executing diverse functions based on the installed programs.

Figure 17:
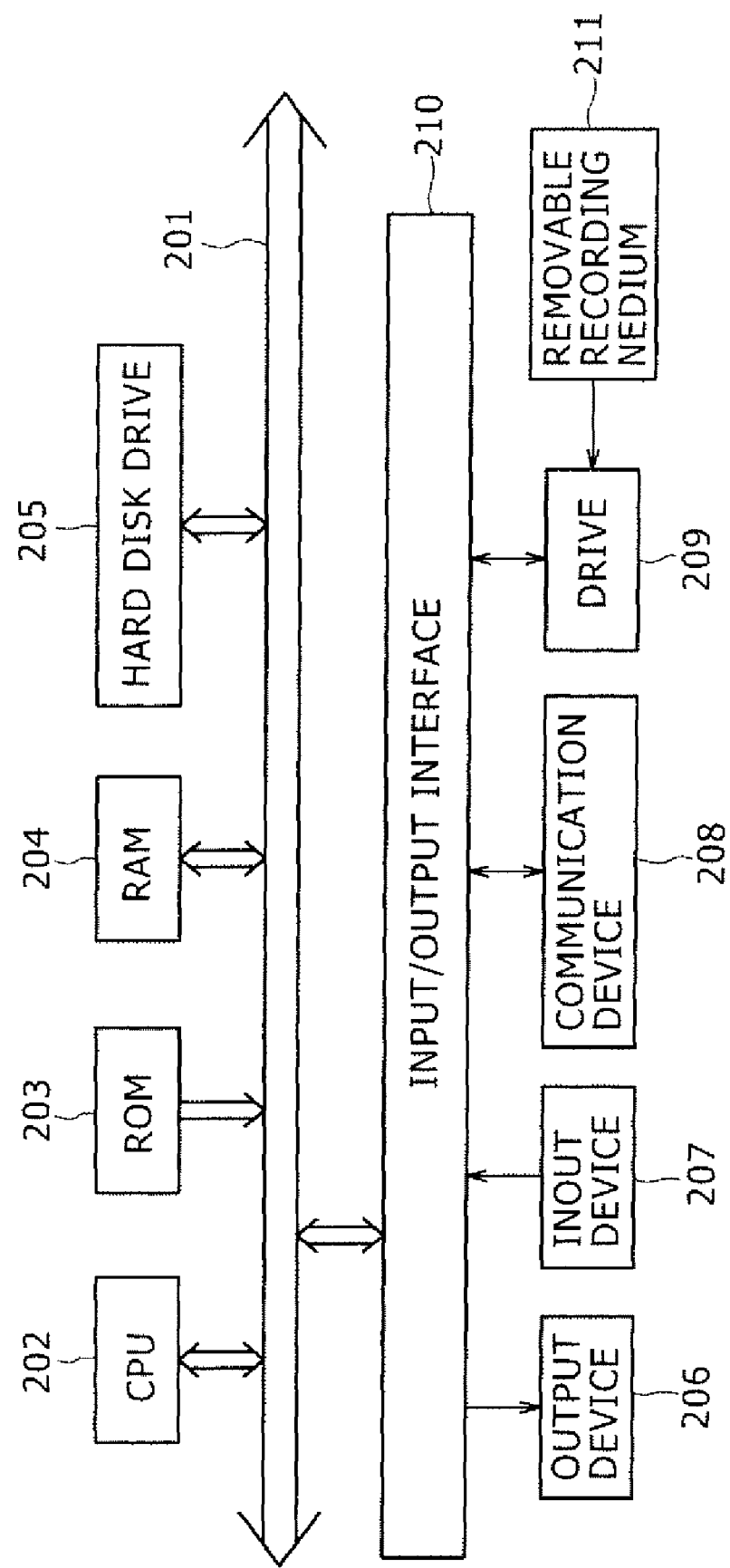
FIG. 17 is a block diagram showing a typical structure of a computer according to the embodiment of the present invention.

FIG. 17 is a block diagram showing a typical structure of a computer according to the embodiment of the present invention. The computer has relevant programs installed so as to execute the above-described steps or processes.

The programs may be written beforehand to a hard disk drive 205 or a ROM 203 incorporated in the computer as a recording medium.

Alternatively, the programs may be stored temporarily or permanently on a removable recording medium 211 such as flexible disks, CD-ROM (Compact Disc Read-Only Memory), MO (Magneto-Optical) disks, DVD (Digital Versatile Disc), magnetic disks, or a semiconductor memory. The removable recording medium 211 then may be offered as a software package.

Instead of getting installed from the removable recording medium 211, the programs may be transferred from download sites to the computer wirelessly via digital satellite broadcast links or in wired fashion over a network such as the Internet. The computer may receive the transferred programs through a communication device 208 and have the received programs installed onto the hard disk drive 205 inside.

The computer incorporates a CPU (Central Processing Unit) 202. An input/output interface 210 is connected to the CPU 202 via a bus 201. The user may enter commands into the CPU 202 by operating an input device 207 made up of a keyboard, a mouse, a microphones etc. Given such commands, the CPU 202 executes relevant programs stored in the ROM 203. For program execution, the CPU 203 may alternatively load into a RAM (Random Access Memory) 204 the programs kept on the hard disk drive 205, the programs transferred via satellite or over the network and installed onto the hard disk drive 205 upon receipt by the communication device 208, or the programs retrieved from the removable recording medium 211 set in a drive 209 and installed onto the hard disk drive 205. By executing the programs, the CPU 202 may carry out the steps or processes in a manner shown in the above-described flowcharts or as illustrated in the block diagrams above. The result of the processing may be sent by the CPU 202 to an output device 206 constituted by an LCD (Liquid Crystal Display), speakers, etc., for output to the outside through the input/output interface 210; to the communication device 208 for transmission to the outside; or to the hard disk drive 205 for storage thereon.

In this specification, the steps describing the programs for causing the computer to execute diverse processing represent not only the processes that are to be carried out in the sequence depicted in the flowcharts (i.e., on a time series basis) but also processes that may be performed parallelly or individually and not chronologically (e.g., in parallel or object-oriented fashion).

The programs may be processed by a single computer or by a plurality of computers on a distributed basis. The programs may also be transferred to a remote computer or computers for execution.

Although the embodiment of the present invention has been described as applicable to the AV system, this is not limitative of the embodiment of the invention. Alternatively, the embodiment of the invention may be applied to diverse interaction apparatuses such as automatic telephone answering systems that handle voice signals as input, ticket reservation systems that deal with entries made through touch-sensitive panels, and TV program reservation systems that accept images as input.

The devices or sections that carry out relevant processes based on operator probabilities are not limited to the interaction device 14 and program recommendation device 15 shown in FIG. 1.

The interaction device 14 (FIG. 1) may cause the output control device 34 to display on the display device 1 a user label identifying the target (user) selected as the operator by the operator selection device 51. In this case, the targets near the HD recorder 3 can readily recognize who the operator is at the moment.

It should be understood by those skilled in the art that various modifications, combinations, sub-combinations and alterations may occur depending on design requirements and other factor in so far as they are within the scope of the appended claims or the equivalents thereof.

What is claimed is:

1. An information processing apparatus for carrying out processes, said information processing apparatus comprising:
   a sensor device configured to sense conditions including information about a plurality of targets each being one of a plurality of users staying close to the apparatus;
   an operator probability computation device configured to compute a plurality of operator probabilities each corresponding to one of the plurality of targets on the basis of the information about the plurality of targets, each of the plurality of operator probability representing how likely the corresponding target is to be an operator operating said information processing apparatus such that the information processing apparatus carries out processes in response to how the operator behaves;
   an operator selection device configured to select a selected operator based on the plurality of operator probabilities;
   an action selection device configured to select an action to be performed based on estimating behavior of the selected operator in one or more scenes sensed by the sensor device; and
   an action execution device configured to perform a predetermined process based on the selected action.

2. The information processing apparatus according to claim 1, wherein said operator probability computation device further comprises:
information extraction means configured to extract from output of said sensor device, information about each of the plurality of targets;
target information creation means configured to create target information about each of the plurality of targets out of the information extracted by said information extraction means; and
probability computation means configured to compute said plurality of operator pluralities on the basis of the target information about each of the plurality of targets.

3. The information processing apparatus according to claim 2, wherein said probability computation device further comprises storage means configured to store the target information created chronologically by said target information creation means;
wherein said probability computation means computes said plurality of operator pluralities based on the chronological target information stored in said storage means.

4. The information processing apparatus according to claim 1, wherein said operator probability computation device computes said plurality of operator pluralities using a Bayesian network.

5. The information processing apparatus according to claim 1, wherein the operator selection device is configured to select out of the plurality of targets a target with the highest corresponding operator probability as the selected operator.

6. The information processing apparatus according to claim 1 further comprising:
preference information storage means configured to store preference information representative of preferences of each of the plurality of targets;
preference information processing means configured to create program recommendation-intended preference information for recommending programs out of the preference information about each of the plurality of targets in accordance with said plurality of operator probabilities; and
service offering means configured to offer a program recommending service based on said program recommendation-intended preference information.

7. The information processing apparatus according to claim 6, wherein said preference information processing means creates as said program recommendation-intended preference information, the information synthesizing the preference information about each of the plurality of targets on the basis of said operator probability for each of the plurality of targets.

8. The information processing apparatus according to claim 6, wherein said preference information creation means creates as said program recommendation-intended preference information, the information associating the preference information about each of the plurality of targets with the number of programs to be recommended based on said preference information, on the basis of said operator probability for each of the plurality of targets.

9. An information processing method for causing an information processing apparatus to carry out a predetermined process, the method comprising the steps of:
receiving information about a plurality of targets each being one of a plurality of users staying close to the apparatus;
computing, on the basis of the information about the plurality of targets, a plurality of operator probabilities each corresponding to one of the plurality of targets and each representing how likely the corresponding target is to be an operator operating said information processing apparatus such that the information processing apparatus carries out processes in response to how the operator behaves;
selecting a selected operator based on the plurality of operator probabilities;
selecting an action to be performed based on estimating behavior of the selected operator in one or more scenes sensed by the sensor device; and
performing the predetermined process based on the selected action.

10. A non-transitory computer readable medium encoded with a computer program product, the computer program product causing a computer to carry out an information processing procedure for an information processing apparatus, the procedure comprising the steps of:
receiving information about a plurality of targets each being one of a plurality of users staying close to the apparatus;
computing, on the basis of the information about the plurality of targets, a plurality of operator probabilities each corresponding to one of the plurality of targets a plurality of operator probabilities each corresponding to one of the plurality of targets and each representing how likely the corresponding target is to be an operator operating said information processing apparatus such that the information processing apparatus carries out processes in response to how the operator behaves;
selecting a selected operator based on the plurality of operator probabilities;
selecting an action to be performed based on estimating behavior of the selected operator in one or more scenes sensed by the sensor device; and
performing a predetermined process based on the selected action.

11. The information processing method of claim 9, wherein the computing a plurality of operator probabilities includes:
extracting, from output of the sensor device, information about each of the plurality of targets;
creating target information about each of the plurality of targets based on the extracted information; and
computing, based on the target information about each of the plurality of targets, the operator probability for each of the one or more targets.

12. The information processing method of claim 11, wherein the computing a plurality of operator probabilities further includes storing the target information created chronologically, and computing the plurality of operator probabilities based on the stored chronological target information.

13. The information processing method of claim 9, wherein the plurality of operator probabilities are computed using Bayesian network.

14. The information processing method of claim 9 wherein selecting a selected operator comprises selecting, out of the plurality of targets, a target with the highest corresponding operator probability as the selected operator.

15. The information processing method of claim 9, further comprising:
storing preference information representative of preferences of each of the plurality of targets;
creating program recommendation-intended preference information for recommending programs out of the preference information about each of the plurality of targets in accordance with the plurality of operator probabilities; and offering a program recommending service based on the program recommendation-intended preference information.

16. The information processing method of claim 15, wherein the creating the program recommendation-intended preference information includes creating information synthesizing the preference information about each of the plurality of targets on the basis of the operator probability for each of the plurality of targets.

17. The information processing method of claim 15, wherein the creating the program recommendation-intended preference information includes creating information associating the preference information about each of the plurality of targets with the number of programs to be recommended based on said preference information, on the basis of said operator probability for each of the plurality of targets.

18. The information processing method of claim 1, wherein the plurality of operator probabilities is based on actions of the plurality of targets sensed by the sensor device.

19. The information processing apparatus of claim 1, wherein the operator operates a television through operating the information processing apparatus.

20. The information processing method of claim 9, wherein computing the plurality of operator probabilities is based on actions of the plurality of targets sensed by the sensor device.

21. The information processing method of claim 9, wherein the operator operates a television through operating the information processing apparatus.

22. The information processing apparatus of claim 1, wherein the information about the plurality of targets includes one or more of motion direction, motion amount, pointing direction, hand position, line of sight direction, talking direction, face direction, face position, and face size.

23. The information processing method of claim 9, wherein the information about the plurality of targets includes one or more of motion direction, motion amount, pointing direction, hand position, line of sight direction, talking direction, face direction, face position, and face size.

* * * * *